United States Patent
Nixon et al.

(10) Patent No.: US 10,282,676 B2
(45) Date of Patent: May 7, 2019

(54) AUTOMATIC SIGNAL PROCESSING-BASED LEARNING IN A PROCESS PLANT

(71) Applicant: FISHER-ROSEMOUNT SYSTEMS, INC., Round Rock, TX (US)

(72) Inventors: Mark J. Nixon, Round Rock, TX (US); Peter Zornio, Austin, TX (US); Wilhelm K. Wojsznis, Austin, TX (US); J. Michael Lucas, Leicester (GB); Paul R. Muston, Narborough (GB); Eric D. Rotvold, West St. Paul, MN (US); Terrence L. Blevins, Round Rock, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 813 days.

(21) Appl. No.: 14/507,252

(22) Filed: Oct. 6, 2014

(65) Prior Publication Data

US 2016/0098647 A1  Apr. 7, 2016

(51) Int. Cl.
*G05B 13/02*  (2006.01)
*G06N 99/00*  (2019.01)

(52) U.S. Cl.
CPC ....... *G06N 99/005* (2013.01); *G05B 13/0265* (2013.01)

(58) Field of Classification Search
CPC .......................... G06N 99/005; G05B 13/0265
(Continued)

(56) References Cited

U.S. PATENT DOCUMENTS 4,451,047 A   5/1984   Herd et al.
4,593,367 A   6/1986   Slack et al.
(Continued)

FOREIGN PATENT DOCUMENTS

AU   2010257310 A1   7/2012
CN     1409179 A      4/2003
(Continued)

OTHER PUBLICATIONS

R. Aouada, S. Aouada, G. d'Urso and A. M. Zoubir, "Source Detection and Separation in Power Plant Process Monitoring: Application of the Bootstrap," 2006 IEEE International Conference on Acoustics Speech and Signal Processing Proceedings, Toulouse, 2006.*

(Continued)

*Primary Examiner* — James D. Rutten
(74) *Attorney, Agent, or Firm* — Marshall, Gerstein & Borun LLP

(57) ABSTRACT

Techniques for automatically or autonomously performing signal processing-based learning in a process plant are disclosed. Generally, said techniques automatically or autonomously perform signal processing on a real-time signal that is generated based on the process plant controlling a process. Typically, the signal corresponds to a parameter value that varies over time, and the signal is processed as it is generated in real-time during on-line plant operations. Results of the signal processing may indicate characteristics of the signal, and one or more analytics functions may determine the sources of the characteristics, which may include a process element or device, a piece of equipment, and/or an asset of the process plant that is upstream, within the process, of the source of the signal. An autonomous signal processor may be integrated with or included in a
(Continued)

process control device and/or a big data node of the process plant.

42 Claims, 5 Drawing Sheets

(58) Field of Classification Search
USPC .......................................................... 700/47
See application file for complete search history.

(56) References Cited

U.S. PATENT DOCUMENTS

| | | |
|---|---|---|
| 4,901,221 A | 2/1990 | Kodosky et al. |
| 4,914,568 A | 4/1990 | Kodosky et al. |
| 5,111,531 A | 5/1992 | Grayson et al. |
| 5,164,897 A | 11/1992 | Clark et al. |
| 5,291,587 A | 3/1994 | Kodosky et al. |
| 5,301,301 A | 4/1994 | Kodosky et al. |
| 5,301,336 A | 4/1994 | Kodosky et al. |
| 5,475,851 A | 12/1995 | Kodosky et al. |
| 5,481,740 A | 1/1996 | Kodosky |
| 5,481,741 A | 1/1996 | McKaskle et al. |
| 5,497,500 A | 3/1996 | Rogers et al. |
| 5,544,320 A | 8/1996 | Konrad |
| 5,568,491 A * | 10/1996 | Beal ................... G05B 13/028 714/26 |
| 5,598,572 A | 1/1997 | Tanikoshi et al. |
| 5,610,828 A | 3/1997 | Kodosky et al. |
| 5,652,909 A | 7/1997 | Kodosky |
| D384,050 S | 9/1997 | Kodosky |
| D384,051 S | 9/1997 | Kodosky |
| D384,052 S | 9/1997 | Kodosky |
| D387,750 S | 12/1997 | Kodosky |
| 5,732,277 A | 3/1998 | Kodosky et al. |
| 5,734,863 A | 3/1998 | Kodosky et al. |
| 5,737,622 A | 4/1998 | Rogers et al. |
| 5,801,942 A | 9/1998 | Nixon et al. |
| 5,801,946 A | 9/1998 | Nissen et al. |
| 5,821,934 A | 10/1998 | Kodosky et al. |
| 5,828,851 A | 10/1998 | Nixon et al. |
| 5,838,563 A | 11/1998 | Dove et al. |
| 5,856,931 A | 1/1999 | McCasland |
| 5,862,052 A | 1/1999 | Nixon et al. |
| 5,862,054 A | 1/1999 | Li |
| 5,909,368 A | 6/1999 | Nixon et al. |
| 5,917,489 A | 6/1999 | Thurlow et al. |
| 5,940,294 A | 8/1999 | Dove |
| 5,971,747 A | 10/1999 | Lemelson et al. |
| 5,980,078 A | 11/1999 | Krivoshein et al. |
| 5,987,246 A | 11/1999 | Thomsen et al. |
| 5,988,847 A | 11/1999 | McLaughlin et al. |
| 5,990,906 A | 11/1999 | Hudson et al. |
| 5,995,916 A | 11/1999 | Nixon et al. |
| 6,009,422 A | 12/1999 | Ciccarelli |
| 6,032,208 A | 2/2000 | Nixon et al. |
| 6,064,409 A | 5/2000 | Thomsen et al. |
| 6,078,320 A | 6/2000 | Dove et al. |
| 6,098,116 A | 8/2000 | Nixon et al. |
| 6,167,464 A | 12/2000 | Kretschmann |
| 6,173,438 B1 | 1/2001 | Kodosky et al. |
| 6,178,504 B1 | 1/2001 | Fieres et al. |
| 6,195,591 B1 | 2/2001 | Nixon et al. |
| 6,219,628 B1 | 4/2001 | Kodosky et al. |
| 6,266,726 B1 | 7/2001 | Nixon et al. |
| 6,278,374 B1 | 8/2001 | Ganeshan |
| 6,285,966 B1 | 9/2001 | Brown et al. |
| 6,295,513 B1 | 9/2001 | Thackston |
| 6,324,877 B2 | 12/2001 | Neeley |
| 6,347,253 B1 | 2/2002 | Fujita et al. |
| 6,421,570 B1 | 7/2002 | McLaughlin et al. |
| 6,442,515 B1 | 8/2002 | Varma et al. |
| 6,463,352 B1 | 10/2002 | Tadokoro et al. |
| 6,529,780 B1 | 3/2003 | Soergel et al. |
| 6,535,883 B1 | 3/2003 | Lee et al. |
| 6,563,430 B1 | 5/2003 | Kemink et al. |
| 6,584,601 B1 | 6/2003 | Kodosky et al. |
| 6,608,638 B1 | 8/2003 | Kodosky et al. |
| 6,609,036 B1 * | 8/2003 | Bickford ............ G05B 23/0254 700/28 |
| 6,658,114 B1 | 12/2003 | Farn et al. |
| 6,701,285 B2 | 3/2004 | Salonen |
| 6,715,078 B1 | 3/2004 | Chasko et al. |
| 6,715,139 B1 | 3/2004 | Kodosky et al. |
| 6,763,515 B1 | 7/2004 | Vazquez et al. |
| 6,768,116 B1 | 7/2004 | Berman et al. |
| 6,772,017 B1 | 8/2004 | Dove et al. |
| 6,784,903 B2 | 8/2004 | Kodosky et al. |
| 6,847,850 B2 | 1/2005 | Grumelart |
| 6,868,538 B1 | 3/2005 | Nixon et al. |
| 6,917,839 B2 * | 7/2005 | Bickford ............ G05B 23/0254 700/28 |
| 6,934,667 B2 | 8/2005 | Kodosky et al. |
| 6,934,668 B2 | 8/2005 | Kodosky et al. |
| 6,954,724 B2 | 10/2005 | Kodosky et al. |
| 6,961,686 B2 | 11/2005 | Kodosky et al. |
| 6,965,886 B2 | 11/2005 | Govrin et al. |
| 6,970,758 B1 | 11/2005 | Shi et al. |
| 6,971,066 B2 | 11/2005 | Schultz et al. |
| 6,983,228 B2 | 1/2006 | Kodosky et al. |
| 6,993,466 B2 | 1/2006 | Kodosky et al. |
| 7,000,190 B2 | 2/2006 | Kudukoli et al. |
| 7,006,881 B1 | 2/2006 | Hoffberg et al. |
| 7,010,470 B2 | 3/2006 | Kodosky et al. |
| 7,062,718 B2 | 6/2006 | Kodosky et al. |
| 7,072,722 B2 | 7/2006 | Colonna et al. |
| 7,123,974 B1 | 10/2006 | Hamilton |
| 7,134,086 B2 | 11/2006 | Kodosky |
| 7,134,090 B2 | 11/2006 | Kodosky et al. |
| 7,143,149 B2 | 11/2006 | Oberg et al. |
| 7,143,289 B2 | 11/2006 | Denning et al. |
| 7,177,786 B2 | 2/2007 | Kodosky et al. |
| 7,185,287 B2 | 2/2007 | Ghercioiu et al. |
| 7,200,838 B2 | 4/2007 | Kodosky et al. |
| 7,210,117 B2 | 4/2007 | Kudukoli et al. |
| 7,213,057 B2 | 5/2007 | Trethewey et al. |
| 7,216,334 B2 | 5/2007 | Kodosky et al. |
| 7,219,306 B2 | 5/2007 | Kodosky et al. |
| 7,222,131 B1 | 5/2007 | Grewal et al. |
| 7,283,914 B2 | 10/2007 | Poorman et al. |
| 7,283,971 B1 | 10/2007 | Levine et al. |
| 7,302,675 B2 | 11/2007 | Rogers et al. |
| 7,314,169 B1 | 1/2008 | Jasper et al. |
| 7,340,737 B2 | 3/2008 | Ghercioiu et al. |
| 7,343,605 B2 | 3/2008 | Langkafel et al. |
| 7,346,404 B2 | 3/2008 | Eryurek et al. |
| 7,367,028 B2 | 4/2008 | Kodosky et al. |
| 7,478,337 B2 | 1/2009 | Kodosky et al. |
| 7,506,304 B2 | 3/2009 | Morrow et al. |
| 7,530,052 B2 | 5/2009 | Morrow et al. |
| 7,530,113 B2 | 5/2009 | Braun |
| 7,536,548 B1 | 5/2009 | Batke et al. |
| RE40,817 E | 6/2009 | Krivoshein et al. |
| 7,541,920 B2 | 6/2009 | Tambascio et al. |
| 7,548,873 B2 | 6/2009 | Veeningen et al. |
| 7,558,711 B2 | 7/2009 | Kodosky et al. |
| 7,565,306 B2 | 7/2009 | Apostolides |
| 7,574,690 B2 | 8/2009 | Shah et al. |
| 7,594,220 B2 | 9/2009 | Kodosky et al. |
| 7,598,856 B1 | 10/2009 | Nick et al. |
| 7,606,681 B2 | 10/2009 | Esmaili et al. |
| 7,616,095 B2 | 11/2009 | Jones et al. |
| 7,617,542 B2 | 11/2009 | Vataja |
| 7,627,860 B2 | 12/2009 | Kodosky et al. |
| 7,630,914 B2 | 12/2009 | Veeningen et al. |
| 7,640,007 B2 | 12/2009 | Chen et al. |
| 7,644,052 B1 | 1/2010 | Chang et al. |
| 7,650,264 B2 | 1/2010 | Kodosky et al. |
| 7,653,563 B2 | 1/2010 | Veeningen et al. |
| 7,668,608 B2 | 2/2010 | Nixon et al. |
| 7,676,281 B2 | 3/2010 | Hood et al. |
| 7,680,546 B2 | 3/2010 | Gilbert et al. |
| 7,684,877 B2 | 3/2010 | Weatherhead et al. |
| RE41,228 E | 4/2010 | Kodosky et al. |
| 7,694,273 B2 | 4/2010 | Kodosky et al. |

(56) References Cited

U.S. PATENT DOCUMENTS

| | | |
|---|---|---|
| 7,707,014 B2 | 4/2010 | Kodosky et al. |
| 7,715,929 B2 | 5/2010 | Skourup et al. |
| 7,716,489 B1 | 5/2010 | Brandt et al. |
| 7,720,727 B2 | 5/2010 | Keyes et al. |
| 7,818,715 B2 | 10/2010 | Kodosky et al. |
| 7,818,716 B2 | 10/2010 | Kodosky et al. |
| 7,827,122 B1 | 11/2010 | Campbell, Jr. et al. |
| 7,831,914 B2 | 11/2010 | Kodosky et al. |
| 7,844,908 B2 | 11/2010 | Kodosky et al. |
| 7,853,431 B2 | 12/2010 | Samardzija et al. |
| 7,865,349 B2 | 1/2011 | Kodosky et al. |
| 7,882,490 B2 | 2/2011 | Kodosky et al. |
| 7,882,491 B2 | 2/2011 | Kodosky et al. |
| 7,925,979 B2 | 4/2011 | Forney et al. |
| 7,930,639 B2 | 4/2011 | Baier et al. |
| 7,934,095 B2 | 4/2011 | Laberteaux et al. |
| 7,937,665 B1 | 5/2011 | Vazquez et al. |
| 7,962,440 B2 | 6/2011 | Baier et al. |
| 7,978,059 B2 | 7/2011 | Petite et al. |
| 7,979,843 B2 | 7/2011 | Kodosky et al. |
| 7,984,423 B2 | 7/2011 | Kodosky et al. |
| 7,987,448 B2 | 7/2011 | Kodosky et al. |
| 8,014,722 B2 | 9/2011 | Abel et al. |
| 8,028,241 B2 | 9/2011 | Kodosky et al. |
| 8,028,242 B2 | 9/2011 | Kodosky et al. |
| 8,055,787 B2 | 11/2011 | Victor et al. |
| 8,060,834 B2 | 11/2011 | Lucas et al. |
| 8,073,967 B2 | 12/2011 | Peterson et al. |
| 8,074,201 B2 | 12/2011 | Ghercioiu et al. |
| 8,099,712 B2 | 1/2012 | Kodosky et al. |
| 8,102,400 B1 | 1/2012 | Cook et al. |
| 8,126,964 B2 | 2/2012 | Pretlove et al. |
| 8,132,225 B2 | 3/2012 | Chand et al. |
| 8,146,053 B2 | 3/2012 | Morrow et al. |
| 8,166,296 B2 | 4/2012 | Buer et al. |
| 8,171,137 B1 | 5/2012 | Parks et al. |
| 8,185,217 B2 | 5/2012 | Thiele |
| 8,185,495 B2 | 5/2012 | Clark et al. |
| 8,185,832 B2 | 5/2012 | Kodosky et al. |
| 8,185,833 B2 | 5/2012 | Kodosky et al. |
| 8,185,871 B2 | 5/2012 | Nixon et al. |
| 8,190,888 B2 | 5/2012 | Batke et al. |
| 8,191,005 B2 | 5/2012 | Baier et al. |
| 8,214,455 B2 | 7/2012 | Baier et al. |
| 8,218,651 B1 | 7/2012 | Eshet et al. |
| 8,219,669 B2 | 7/2012 | Agrusa et al. |
| 8,224,496 B2 | 7/2012 | Musti et al. |
| 8,239,848 B2 | 8/2012 | Ghercioiu et al. |
| 8,266,066 B1 | 9/2012 | Wezter et al. |
| 8,290,762 B2 | 10/2012 | Kodosky et al. |
| 8,307,330 B2 | 11/2012 | Kumar et al. |
| 8,316,313 B2 | 11/2012 | Campney et al. |
| 8,321,663 B2 | 11/2012 | Medvinsky et al. |
| 8,327,130 B2 | 12/2012 | Wilkinson, Jr. et al. |
| 8,350,666 B2 | 1/2013 | Kore |
| 8,359,567 B2 | 1/2013 | Kornerup et al. |
| 8,397,172 B2 | 3/2013 | Kodosky et al. |
| 8,397,205 B2 | 3/2013 | Kornerup et al. |
| 8,413,118 B2 | 4/2013 | Kodosky et al. |
| 8,417,360 B2 | 4/2013 | Sustaeta et al. |
| 8,417,595 B2 | 4/2013 | Keyes et al. |
| 8,418,071 B2 | 4/2013 | Kodosky et al. |
| 8,429,627 B2 | 4/2013 | Jedlicka et al. |
| 8,448,135 B2 | 5/2013 | Kodosky |
| 8,521,332 B2 | 8/2013 | Tiemann et al. |
| 8,532,795 B2 | 9/2013 | Adavi et al. |
| 8,570,922 B2 | 10/2013 | Pratt, Jr. et al. |
| 8,612,870 B2 | 12/2013 | Kodosky et al. |
| 8,624,725 B1 | 1/2014 | MacGregor |
| 8,640,112 B2 | 1/2014 | Yi et al. |
| 8,656,351 B2 | 2/2014 | Kodosky et al. |
| 8,688,780 B2 | 4/2014 | Gordon et al. |
| 8,781,776 B2 | 7/2014 | Onda et al. |
| 8,832,236 B2 | 9/2014 | Hernandez et al. |
| 8,943,469 B2 | 1/2015 | Kumar et al. |
| 8,977,851 B2 | 3/2015 | Neitzel et al. |
| 9,002,973 B2 | 4/2015 | Panther |
| 9,021,021 B2 | 4/2015 | Backholm et al. |
| 9,024,972 B1 | 5/2015 | Bronder et al. |
| 9,038,043 B1 | 5/2015 | Fleetwood et al. |
| 9,047,007 B2 | 6/2015 | Kodosky et al. |
| 9,088,665 B2 | 7/2015 | Boyer et al. |
| 9,098,164 B2 | 8/2015 | Kodosky |
| 9,110,558 B2 | 8/2015 | Kodosky |
| 9,119,166 B1 | 8/2015 | Sheikh |
| 9,122,764 B2 | 9/2015 | Neitzel et al. |
| 9,122,786 B2 | 9/2015 | Cammert et al. |
| 9,134,895 B2 | 9/2015 | Dove et al. |
| 9,229,871 B2 | 1/2016 | Washiro |
| 9,235,395 B2 | 1/2016 | Kodosky et al. |
| 9,338,218 B1 | 5/2016 | Florissi et al. |
| 9,361,320 B1 | 6/2016 | Vijendra et al. |
| 9,397,836 B2 | 7/2016 | Nixon et al. |
| 9,424,398 B1 | 8/2016 | McLeod et al. |
| 9,430,114 B1 | 8/2016 | Dingman et al. |
| 9,459,809 B1 | 10/2016 | Chen et al. |
| 9,532,232 B2 | 12/2016 | Dewey et al. |
| 9,541,905 B2 | 1/2017 | Nixon et al. |
| 9,558,220 B2 | 1/2017 | Nixon et al. |
| 9,652,213 B2 | 5/2017 | MacCleery et al. |
| 9,678,484 B2 | 6/2017 | Nixon et al. |
| 9,697,170 B2 | 7/2017 | Nixon et al. |
| 9,804,588 B2 | 10/2017 | Blevins et al. |
| 9,892,353 B1 | 2/2018 | Lui et al. |
| 2002/0010694 A1 | 1/2002 | Navab et al. |
| 2002/0035495 A1 | 3/2002 | Spira et al. |
| 2002/0052715 A1 | 5/2002 | Maki |
| 2002/0054130 A1 | 5/2002 | Abbott et al. |
| 2002/0064138 A1 | 5/2002 | Saito et al. |
| 2002/0080174 A1 | 6/2002 | Kodosky et al. |
| 2002/0087419 A1 | 7/2002 | Andersson et al. |
| 2002/0094085 A1 | 7/2002 | Roberts |
| 2002/0120475 A1 | 8/2002 | Morimoto |
| 2002/0128998 A1 | 9/2002 | Kil et al. |
| 2002/0130846 A1 | 9/2002 | Nixon et al. |
| 2002/0138168 A1 | 9/2002 | Salonen |
| 2002/0138320 A1 | 9/2002 | Robertson et al. |
| 2002/0149497 A1 | 10/2002 | Jaggi |
| 2002/0159441 A1 | 10/2002 | Travaly et al. |
| 2002/0169514 A1 | 11/2002 | Eryurek et al. |
| 2003/0020726 A1 | 1/2003 | Charpentier |
| 2003/0023795 A1 | 1/2003 | Packwood et al. |
| 2003/0028495 A1 | 2/2003 | Pallante |
| 2003/0061295 A1 | 3/2003 | Oberg et al. |
| 2003/0083756 A1 | 5/2003 | Hsiung et al. |
| 2003/0084053 A1* | 5/2003 | Govrin ............ G06F 17/30592 |
| 2003/0093309 A1 | 5/2003 | Tanikoshi et al. |
| 2003/0147351 A1 | 8/2003 | Greenlee |
| 2003/0154044 A1 | 8/2003 | Lundstedt et al. |
| 2003/0195934 A1 | 10/2003 | Peterson et al. |
| 2004/0005859 A1 | 1/2004 | Ghercioiu et al. |
| 2004/0012632 A1 | 1/2004 | King et al. |
| 2004/0014479 A1 | 1/2004 | Milman |
| 2004/0075689 A1 | 4/2004 | Schleiss et al. |
| 2004/0093102 A1 | 5/2004 | Liiri et al. |
| 2004/0117233 A1 | 6/2004 | Rapp |
| 2004/0133457 A1 | 7/2004 | Sadiq et al. |
| 2004/0153437 A1 | 8/2004 | Buchan |
| 2004/0153804 A1 | 8/2004 | Blevins et al. |
| 2004/0203874 A1 | 10/2004 | Brandt et al. |
| 2004/0204775 A1 | 10/2004 | Keyes et al. |
| 2004/0210330 A1 | 10/2004 | Birkle |
| 2004/0230328 A1 | 11/2004 | Armstrong et al. |
| 2004/0233930 A1 | 11/2004 | Colby |
| 2005/0005259 A1 | 1/2005 | Avery et al. |
| 2005/0060111 A1* | 3/2005 | Ramillon ............... G01H 3/08 |
| | | 702/76 |
| 2005/0062677 A1 | 3/2005 | Nixon et al. |
| 2005/0080799 A1 | 4/2005 | Harnden et al. |
| 2005/0096872 A1 | 5/2005 | Blevins et al. |
| 2005/0130634 A1 | 6/2005 | Godfrey |
| 2005/0164684 A1 | 7/2005 | Chen et al. |
| 2005/0182650 A1 | 8/2005 | Maddox et al. |
| 2005/0187649 A1 | 8/2005 | Funk et al. |

(56) References Cited

U.S. PATENT DOCUMENTS

| | | |
|---|---|---|
| 2005/0213768 A1 | 9/2005 | Durham et al. |
| 2005/0222691 A1 | 10/2005 | Glas et al. |
| 2005/0222698 A1 | 10/2005 | Eryurek et al. |
| 2005/0264527 A1 | 12/2005 | Lin |
| 2006/0031826 A1 | 2/2006 | Hiramatsu et al. |
| 2006/0064291 A1 | 3/2006 | Pattipatti et al. |
| 2006/0064472 A1 | 3/2006 | Mirho |
| 2006/0069717 A1 | 3/2006 | Mamou et al. |
| 2006/0087402 A1 | 4/2006 | Manning et al. |
| 2006/0168396 A1 | 7/2006 | LaMothe et al. |
| 2006/0200260 A1 | 9/2006 | Hoffberg et al. |
| 2006/0200771 A1 | 9/2006 | Nielsen et al. |
| 2006/0218107 A1 | 9/2006 | Young |
| 2006/0235741 A1 | 10/2006 | Deaton et al. |
| 2006/0241792 A1 | 10/2006 | Pretlove et al. |
| 2006/0288091 A1 | 12/2006 | Oh et al. |
| 2006/0291481 A1 | 12/2006 | Kumar |
| 2006/0294087 A1 | 12/2006 | Mordvinov |
| 2007/0005266 A1 | 1/2007 | Blevins et al. |
| 2007/0014406 A1 | 1/2007 | Scheidt et al. |
| 2007/0038889 A1 | 2/2007 | Wiggins et al. |
| 2007/0067725 A1 | 3/2007 | Cahill et al. |
| 2007/0078696 A1 | 4/2007 | Hardin |
| 2007/0112574 A1 | 5/2007 | Greene |
| 2007/0118516 A1 | 5/2007 | Li et al. |
| 2007/0130310 A1 | 6/2007 | Batke et al. |
| 2007/0130572 A1 | 6/2007 | Gilbert et al. |
| 2007/0132779 A1 | 6/2007 | Gilbert et al. |
| 2007/0139441 A1 | 6/2007 | Lucas et al. |
| 2007/0179645 A1 | 8/2007 | Nixon et al. |
| 2007/0185754 A1 | 8/2007 | Schmidt |
| 2007/0211079 A1 | 9/2007 | Nixon et al. |
| 2007/0239292 A1 | 10/2007 | Ehrman et al. |
| 2007/0250292 A1 | 10/2007 | Alagappan et al. |
| 2007/0265801 A1 | 11/2007 | Foslien et al. |
| 2007/0265866 A1 | 11/2007 | Fehling et al. |
| 2008/0040719 A1 | 2/2008 | Shimizu et al. |
| 2008/0046104 A1 | 2/2008 | Van Camp et al. |
| 2008/0058968 A1 | 3/2008 | Sharma et al. |
| 2008/0065243 A1 | 3/2008 | Fallman et al. |
| 2008/0065705 A1 | 3/2008 | Miller |
| 2008/0065706 A1 | 3/2008 | Miller et al. |
| 2008/0076431 A1 | 3/2008 | Fletcher et al. |
| 2008/0078189 A1 | 4/2008 | Ando |
| 2008/0079596 A1 | 4/2008 | Baier et al. |
| 2008/0082180 A1 | 4/2008 | Blevins et al. |
| 2008/0082181 A1 | 4/2008 | Miller et al. |
| 2008/0082195 A1 | 4/2008 | Samardzija |
| 2008/0097622 A1 | 4/2008 | Forney et al. |
| 2008/0103843 A1 | 5/2008 | Goeppert et al. |
| 2008/0104189 A1 | 5/2008 | Baker et al. |
| 2008/0125912 A1 | 5/2008 | Heilman et al. |
| 2008/0126352 A1 | 5/2008 | Case |
| 2008/0126665 A1 | 5/2008 | Burr et al. |
| 2008/0143482 A1 | 6/2008 | Shoarinejad et al. |
| 2008/0174766 A1 | 7/2008 | Haaslahti et al. |
| 2008/0182592 A1 | 7/2008 | Cha et al. |
| 2008/0209443 A1 | 8/2008 | Suzuki |
| 2008/0249641 A1 | 10/2008 | Enver et al. |
| 2008/0274766 A1 | 11/2008 | Pratt et al. |
| 2008/0275971 A1 | 11/2008 | Pretlove et al. |
| 2008/0288321 A1 | 11/2008 | Dillon et al. |
| 2008/0297513 A1 | 12/2008 | Greenhill et al. |
| 2008/0301123 A1 | 12/2008 | Schneider et al. |
| 2009/0049073 A1 | 2/2009 | Cho |
| 2009/0065578 A1 | 3/2009 | Peterson et al. |
| 2009/0070337 A1 | 3/2009 | Romem et al. |
| 2009/0070589 A1 | 3/2009 | Nayak et al. |
| 2009/0089233 A1 | 4/2009 | Gach et al. |
| 2009/0089359 A1 | 4/2009 | Siorek et al. |
| 2009/0089709 A1 | 4/2009 | Baier et al. |
| 2009/0094531 A1 | 4/2009 | Danieli et al. |
| 2009/0097502 A1 | 4/2009 | Yamamoto |
| 2009/0112335 A1 | 4/2009 | Mehta et al. |
| 2009/0112532 A1 | 4/2009 | Foslien et al. |
| 2009/0210386 A1 | 8/2009 | Cahill |
| 2009/0210802 A1 | 8/2009 | Hawkins et al. |
| 2009/0210814 A1 | 8/2009 | Agrusa et al. |
| 2009/0216341 A1 | 8/2009 | Enkerud et al. |
| 2009/0249237 A1 | 10/2009 | Jundt et al. |
| 2009/0284383 A1 | 11/2009 | Wiles et al. |
| 2009/0294174 A1 | 12/2009 | Harmer et al. |
| 2009/0300535 A1 | 12/2009 | Skourup et al. |
| 2009/0319058 A1 | 12/2009 | Rovaglio et al. |
| 2009/0325603 A1 | 12/2009 | Van Os et al. |
| 2009/0327014 A1 | 12/2009 | Labedz et al. |
| 2010/0036779 A1 | 2/2010 | Sadeh-Koniecpol et al. |
| 2010/0069008 A1 | 3/2010 | Oshima et al. |
| 2010/0076642 A1 | 3/2010 | Hoffberg et al. |
| 2010/0082132 A1 | 4/2010 | Marruchella et al. |
| 2010/0082158 A1 | 4/2010 | Lakomiak et al. |
| 2010/0106282 A1 | 4/2010 | Mackelprang et al. |
| 2010/0127821 A1 | 5/2010 | Jones et al. |
| 2010/0127824 A1 | 5/2010 | Moschl et al. |
| 2010/0145476 A1 | 6/2010 | Junk et al. |
| 2010/0169785 A1 | 7/2010 | Jesudason |
| 2010/0185857 A1 | 7/2010 | Neitzel et al. |
| 2010/0190442 A1 | 7/2010 | Citrano, III et al. |
| 2010/0192122 A1 | 7/2010 | Esfahan et al. |
| 2010/0222899 A1 | 9/2010 | Blevins et al. |
| 2010/0262929 A1 | 10/2010 | Avery |
| 2010/0275135 A1 | 10/2010 | Dunton et al. |
| 2010/0286798 A1 | 11/2010 | Keyes et al. |
| 2010/0290351 A1 | 11/2010 | Toepke et al. |
| 2010/0290359 A1 | 11/2010 | Dewey et al. |
| 2010/0293019 A1 | 11/2010 | Keyes et al. |
| 2010/0293564 A1 | 11/2010 | Gould et al. |
| 2010/0305736 A1 | 12/2010 | Arduini |
| 2010/0318934 A1 | 12/2010 | Blevins et al. |
| 2011/0022193 A1 | 1/2011 | Panaitescu |
| 2011/0046754 A1 | 2/2011 | Bromley et al. |
| 2011/0071869 A1 | 3/2011 | O'Brien et al. |
| 2011/0072338 A1 | 3/2011 | Caldwell |
| 2011/0098918 A1 | 4/2011 | Siliski et al. |
| 2011/0115816 A1 | 5/2011 | Brackney |
| 2011/0130848 A1 | 6/2011 | Tegnell et al. |
| 2011/0140864 A1 | 6/2011 | Bucci |
| 2011/0144777 A1 | 6/2011 | Firkins et al. |
| 2011/0191277 A1 | 8/2011 | Ag ndez Dominguez et al. |
| 2011/0238189 A1 | 9/2011 | Butera et al. |
| 2011/0258138 A1 | 10/2011 | Kulkarni et al. |
| 2011/0276896 A1 | 11/2011 | Zambetti et al. |
| 2011/0276908 A1 | 11/2011 | O'Riordan |
| 2011/0282793 A1 | 11/2011 | Mercuri et al. |
| 2011/0295722 A1 | 12/2011 | Reisman |
| 2012/0004743 A1 | 1/2012 | Anne et al. |
| 2012/0005270 A1 | 1/2012 | Harding et al. |
| 2012/0010758 A1 | 1/2012 | Francino et al. |
| 2012/0011180 A1 | 1/2012 | Kavaklioglu |
| 2012/0011511 A1 | 1/2012 | Horvitz et al. |
| 2012/0029661 A1 | 2/2012 | Jones et al. |
| 2012/0038458 A1 | 2/2012 | Toepke et al. |
| 2012/0040698 A1 | 2/2012 | Ferguson et al. |
| 2012/0078869 A1 | 3/2012 | Bellville et al. |
| 2012/0095574 A1 | 4/2012 | Greenlee |
| 2012/0147862 A1 | 6/2012 | Poojary et al. |
| 2012/0163521 A1 | 6/2012 | Kirrmann et al. |
| 2012/0176491 A1 | 7/2012 | Garin et al. |
| 2012/0203728 A1 | 8/2012 | Levine |
| 2012/0226985 A1 | 9/2012 | Chervets et al. |
| 2012/0230309 A1 | 9/2012 | Junk |
| 2012/0239164 A1 | 9/2012 | Smith et al. |
| 2012/0249588 A1 | 10/2012 | Tison et al. |
| 2012/0271962 A1 | 10/2012 | Ivanov et al. |
| 2012/0290795 A1 | 11/2012 | Dowlatkhah |
| 2012/0331541 A1 | 12/2012 | Hamilton, II et al. |
| 2013/0006696 A1 | 1/2013 | Louie et al. |
| 2013/0007223 A1 | 1/2013 | Luby et al. |
| 2013/0013523 A1 | 1/2013 | Herrera Campos |
| 2013/0029686 A1 | 1/2013 | Moshfeghi |
| 2013/0041479 A1 | 2/2013 | Zhang et al. |
| 2013/0060354 A1 | 3/2013 | Choi et al. |
| 2013/0086591 A1 | 4/2013 | Haven |
| 2013/0095849 A1 | 4/2013 | Pakzad |

(56) References Cited

U.S. PATENT DOCUMENTS

| | | |
|---|---|---|
| 2013/0120449 A1* | 5/2013 | Ihara .............. G06F 11/0727 345/633 |
| 2013/0127980 A1 | 5/2013 | Haddick et al. |
| 2013/0144404 A1 | 6/2013 | Godwin et al. |
| 2013/0144405 A1 | 6/2013 | Lo |
| 2013/0144605 A1 | 6/2013 | Brager et al. |
| 2013/0151563 A1 | 6/2013 | Addepalli et al. |
| 2013/0159200 A1 | 6/2013 | Paul et al. |
| 2013/0169526 A1 | 7/2013 | Gai et al. |
| 2013/0184847 A1 | 7/2013 | Fruh et al. |
| 2013/0197954 A1 | 8/2013 | Yankelevich et al. |
| 2013/0211555 A1 | 8/2013 | Lawson et al. |
| 2013/0212129 A1 | 8/2013 | Lawson et al. |
| 2013/0214902 A1 | 8/2013 | Pineau et al. |
| 2013/0217417 A1 | 8/2013 | Mohideen et al. |
| 2013/0231947 A1 | 9/2013 | Shusterman |
| 2013/0257627 A1 | 10/2013 | Rafael |
| 2013/0265857 A1 | 10/2013 | Foulds et al. |
| 2013/0282150 A1 | 10/2013 | Panther et al. |
| 2013/0318536 A1 | 11/2013 | Fletcher et al. |
| 2014/0006338 A1* | 1/2014 | Watson ............ G06F 17/30563 707/602 |
| 2014/0015672 A1 | 1/2014 | Ponce |
| 2014/0039648 A1 | 2/2014 | Boult et al. |
| 2014/0067800 A1 | 3/2014 | Sharma |
| 2014/0079297 A1 | 3/2014 | Tadayon et al. |
| 2014/0089504 A1 | 3/2014 | Scholz et al. |
| 2014/0108985 A1 | 4/2014 | Scott et al. |
| 2014/0122806 A1 | 5/2014 | Lin et al. |
| 2014/0123276 A1 | 5/2014 | Bush et al. |
| 2014/0136652 A1 | 5/2014 | Narayanaswami et al. |
| 2014/0156032 A1 | 6/2014 | Jenkins et al. |
| 2014/0164603 A1 | 6/2014 | Castel et al. |
| 2014/0172961 A1 | 6/2014 | Clemmer et al. |
| 2014/0180671 A1 | 6/2014 | Osipova |
| 2014/0180970 A1 | 6/2014 | Hettenkofer et al. |
| 2014/0189520 A1 | 7/2014 | Crepps et al. |
| 2014/0201244 A1 | 7/2014 | Zhou |
| 2014/0232843 A1 | 8/2014 | Campbell |
| 2014/0250153 A1 | 9/2014 | Nixon et al. |
| 2014/0267599 A1 | 9/2014 | Drouin et al. |
| 2014/0273847 A1 | 9/2014 | Nixon et al. |
| 2014/0274123 A1 | 9/2014 | Nixon et al. |
| 2014/0277593 A1 | 9/2014 | Nixon et al. |
| 2014/0277594 A1 | 9/2014 | Nixon et al. |
| 2014/0277595 A1 | 9/2014 | Nixon et al. |
| 2014/0277596 A1 | 9/2014 | Nixon et al. |
| 2014/0277604 A1 | 9/2014 | Nixon et al. |
| 2014/0277605 A1 | 9/2014 | Nixon et al. |
| 2014/0277607 A1 | 9/2014 | Nixon et al. |
| 2014/0277615 A1 | 9/2014 | Nixon et al. |
| 2014/0277616 A1 | 9/2014 | Nixon et al. |
| 2014/0277617 A1 | 9/2014 | Nixon et al. |
| 2014/0277618 A1 | 9/2014 | Nixon et al. |
| 2014/0277656 A1 | 9/2014 | Nixon et al. |
| 2014/0278312 A1 | 9/2014 | Nixon et al. |
| 2014/0280497 A1 | 9/2014 | Nixon et al. |
| 2014/0280678 A1 | 9/2014 | Nixon et al. |
| 2014/0282015 A1 | 9/2014 | Nixon et al. |
| 2014/0282227 A1 | 9/2014 | Nixon et al. |
| 2014/0282257 A1 | 9/2014 | Nixon et al. |
| 2014/0297225 A1 | 10/2014 | Petroski et al. |
| 2014/0316579 A1 | 10/2014 | Taylor et al. |
| 2014/0358256 A1 | 12/2014 | Billi et al. |
| 2014/0359552 A1 | 12/2014 | Misra et al. |
| 2014/0372378 A1 | 12/2014 | Long et al. |
| 2014/0372561 A1 | 12/2014 | Hisano |
| 2014/0379296 A1 | 12/2014 | Nathan et al. |
| 2015/0024710 A1 | 1/2015 | Becker et al. |
| 2015/0067163 A1 | 3/2015 | Bahnsen et al. |
| 2015/0106578 A1 | 4/2015 | Warfield et al. |
| 2015/0172872 A1 | 6/2015 | Alsehly et al. |
| 2015/0177718 A1 | 6/2015 | Vartiainen et al. |
| 2015/0220080 A1 | 8/2015 | Nixon et al. |
| 2015/0222731 A1 | 8/2015 | Shinohara et al. |
| 2015/0246852 A1 | 9/2015 | Chen et al. |
| 2015/0261215 A1 | 9/2015 | Blevins et al. |
| 2015/0278397 A1 | 10/2015 | Hendrickson et al. |
| 2015/0296324 A1 | 10/2015 | Garaas et al. |
| 2015/0312721 A1 | 10/2015 | Singh et al. |
| 2015/0332188 A1 | 11/2015 | Yankelevich et al. |
| 2016/0098021 A1 | 4/2016 | Zornio et al. |
| 2016/0098037 A1 | 4/2016 | Zornio et al. |
| 2016/0098388 A1 | 4/2016 | Blevins et al. |
| 2016/0132046 A1 | 5/2016 | Beoughter et al. |
| 2016/0261482 A1 | 9/2016 | Mixer et al. |
| 2016/0327942 A1 | 11/2016 | Nixon et al. |
| 2017/0102678 A1 | 4/2017 | Nixon et al. |
| 2017/0102693 A1 | 4/2017 | Kidd et al. |
| 2017/0102694 A1 | 4/2017 | Enver et al. |
| 2017/0102696 A1 | 4/2017 | Bell et al. |
| 2017/0103103 A1 | 4/2017 | Nixon et al. |
| 2017/0115648 A1 | 4/2017 | Nixon et al. |
| 2017/0154395 A1 | 6/2017 | Podgurny et al. |
| 2017/0199843 A1 | 7/2017 | Nixon et al. |
| 2017/0235298 A1 | 8/2017 | Nixon et al. |
| 2017/0236067 A1 | 8/2017 | Tjiong |
| 2018/0151037 A1 | 5/2018 | Morgenthau et al. |

FOREIGN PATENT DOCUMENTS

| | | |
|---|---|---|
| CN | 1409232 A | 4/2003 |
| CN | 1537258 A | 10/2004 |
| CN | 1589423 A | 3/2005 |
| CN | 1757002 A | 4/2006 |
| CN | 1804744 A | 7/2006 |
| CN | 1805040 A | 7/2006 |
| CN | 1826565 A | 8/2006 |
| CN | 1864156 A | 11/2006 |
| CN | 1980194 A | 6/2007 |
| CN | 101097136 A | 1/2008 |
| CN | 101387882 A | 3/2009 |
| CN | 101449259 A | 6/2009 |
| CN | 201374004 Y | 12/2009 |
| CN | 101713985 A | 5/2010 |
| CN | 101788820 A | 7/2010 |
| CN | 101802736 A | 8/2010 |
| CN | 101828195 A | 9/2010 |
| CN | 101867566 A | 10/2010 |
| CN | 102063097 A | 5/2011 |
| CN | 102124432 A | 7/2011 |
| CN | 102169182 A | 8/2011 |
| CN | 102175174 A | 9/2011 |
| CN | 102184489 A | 9/2011 |
| CN | 102200993 A | 9/2011 |
| CN | 102213959 A | 10/2011 |
| CN | 102239452 A | 11/2011 |
| CN | 102243315 A | 11/2011 |
| CN | 102278987 A | 12/2011 |
| CN | 202101268 U | 1/2012 |
| CN | 102349031 A | 2/2012 |
| CN | 102375453 A | 3/2012 |
| CN | 102378989 A | 3/2012 |
| CN | 102402215 A | 4/2012 |
| CN | 102436205 A | 5/2012 |
| CN | 102494630 A | 6/2012 |
| CN | 102494683 A | 6/2012 |
| CN | 102637027 A | 8/2012 |
| CN | 102640156 A | 8/2012 |
| CN | 102707689 A | 10/2012 |
| CN | 102710861 A | 10/2012 |
| CN | 102867237 A | 1/2013 |
| CN | 103106188 A | 5/2013 |
| CN | 103403686 A | 11/2013 |
| CN | 103576638 A | 2/2014 |
| CN | 104035392 A | 9/2014 |
| DE | 19882113 T1 | 1/2000 |
| DE | 19882117 T1 | 1/2000 |
| EP | 0 308 390 A1 | 3/1989 |
| EP | 0 335 957 A1 | 10/1989 |
| EP | 1 344 291 A1 | 9/2003 |
| EP | 1 414 215 A2 | 4/2004 |
| EP | 1 564 647 A2 | 8/2005 |
| EP | 1 912 376 A1 | 4/2008 |

(56) References Cited

FOREIGN PATENT DOCUMENTS

| | | |
|---|---|---|
| EP | 2 003 813 A1 | 12/2008 |
| EP | 2 112 614 A1 | 10/2009 |
| EP | 2 180 441 A1 | 4/2010 |
| EP | 2 469 475 A1 | 6/2012 |
| EP | 1 344 291 B1 | 8/2012 |
| EP | 2 685 329 A1 | 1/2014 |
| EP | 2 704 401 A1 | 3/2014 |
| EP | 2 746 884 A1 | 6/2014 |
| EP | 2 801 939 A1 | 11/2014 |
| FR | 2 966 625 A1 | 4/2012 |
| GB | 2 336 977 B | 11/1999 |
| GB | 2 336 923 B | 6/2002 |
| GB | 2 403 028 A | 12/2004 |
| GB | 2 453 426 A | 4/2009 |
| GB | 2 512 984 A | 10/2014 |
| GB | 2 512 997 A | 10/2014 |
| GB | 2 532 849 A | 6/2016 |
| GB | 2 534 628 A | 8/2016 |
| GB | 2 537 457 A | 10/2016 |
| JP | 64-017105 A | 1/1989 |
| JP | 01-291303 A | 11/1989 |
| JP | 05-073131 A | 3/1993 |
| JP | 05-142033 A | 6/1993 |
| JP | 05-187973 A | 7/1993 |
| JP | 06-052145 A | 2/1994 |
| JP | 08-234951 | 9/1996 |
| JP | 09-330861 A | 12/1997 |
| JP | 10-116113 A | 5/1998 |
| JP | 10-326111 A | 12/1998 |
| JP | 11-327628 A | 11/1999 |
| JP | 2000-214914 A | 8/2000 |
| JP | 2001-512593 A | 8/2001 |
| JP | 2001-265821 A | 9/2001 |
| JP | 2002-010489 A | 1/2002 |
| JP | 2002-024423 A | 1/2002 |
| JP | 2002-99325 A | 4/2002 |
| JP | 2003-295944 A | 10/2003 |
| JP | 2004-102765 A | 4/2004 |
| JP | 2004-171127 A | 6/2004 |
| JP | 2004-199624 A | 7/2004 |
| JP | 2004-227561 A | 8/2004 |
| JP | 2005-107758 A | 4/2005 |
| JP | 2005-216137 A | 8/2005 |
| JP | 2005-242830 A | 9/2005 |
| JP | 2005-332093 A | 12/2005 |
| JP | 2006-172462 A | 6/2006 |
| JP | 2006-221376 A | 8/2006 |
| JP | 2006-527426 A | 11/2006 |
| JP | 2007-137563 A | 6/2007 |
| JP | 2007-148938 A | 6/2007 |
| JP | 2007-207065 A | 8/2007 |
| JP | 2007-242000 A | 9/2007 |
| JP | 2007-286798 A | 11/2007 |
| JP | 2007-536631 A | 12/2007 |
| JP | 2007-536648 A | 12/2007 |
| JP | 2008-065821 A | 3/2008 |
| JP | 2008-158971 A | 7/2008 |
| JP | 2008-305419 A | 12/2008 |
| JP | 2009-064451 A | 3/2009 |
| JP | 2009-140380 A | 6/2009 |
| JP | 2009-211522 A | 9/2009 |
| JP | 2009-251777 A | 10/2009 |
| JP | 2010-527486 A | 8/2010 |
| JP | 2011-022920 A | 2/2011 |
| JP | 2011-034564 A | 2/2011 |
| JP | 2011-204237 A | 10/2011 |
| JP | 2011-204238 A | 10/2011 |
| JP | 2012-048762 A | 3/2012 |
| JP | 2012-069118 A | 4/2012 |
| JP | 2012-084162 A | 4/2012 |
| JP | 4-934482 B2 | 5/2012 |
| JP | 2012-215547 A | 11/2012 |
| JP | 2012-527059 A | 11/2012 |
| JP | 2014-116027 A | 6/2014 |
| WO | WO-02/50971 | 6/2002 |
| WO | WO-03/073688 A1 | 9/2003 |
| WO | WO-2003/073688 A1 | 9/2003 |
| WO | WO-2005/083533 A1 | 9/2005 |
| WO | WO-2005/109123 A1 | 11/2005 |
| WO | WO-2008/042786 A2 | 4/2008 |
| WO | WO-2009/021900 A1 | 2/2009 |
| WO | WO-2009/046095 A1 | 4/2009 |
| WO | WO-2011/120625 A1 | 10/2011 |
| WO | WO-2012/016012 A2 | 2/2012 |
| WO | WO-2012/022381 A1 | 2/2012 |
| WO | WO-2012/096877 A1 | 7/2012 |
| WO | WO-2014/005073 A1 | 1/2014 |
| WO | WO-2014/145801 A2 | 9/2014 |
| WO | WO-2015/138706 A1 | 9/2015 |
| WO | WO-2016/057365 A1 | 4/2016 |

OTHER PUBLICATIONS

J. Zhu, Q. Chen and J. Zhang, "Localization optimization algorithm of maximum likelihood estimation based on received signal strength," 2017 IEEE 9th International Conference on Communication Software and Networks (ICCSN), Guangzhou, 2017, pp. 830-834. (Year: 2017).*

"ANSI/ISA-S5.4-1991 American National Standard Instrument Loop Diagrams" by Instrument Society of America, 1986, 22 pages.

"Control Loop Foundation—Batch and Continuous Processes", by Terrence Blevins and Mark Nixon, *International Society of Automation*, 2011, Chapter 7.

Examination Report for Application No. GB1017192.4, dated May 28, 2014.

Examination Report for Application No. GB1017192.4, dated Sep. 5, 2013.

First Office Action for Chinese Application No. 201010589029.X, dated Dec. 10, 2013.

Notice of Reasons for Rejection for Japanese Application No. 2010-229513, dated Jul. 29, 2014.

Search Report for Application No. GB1017192.4, dated Feb. 15, 2011.

Search Report for Application No. GB1402311.3, dated Aug. 6, 2014.

Search Report for Application No. GB1403251.0, dated Aug. 8, 2014.

Search Report for Application No. GB1403407.8, dated Aug. 8, 2014.

Search Report for Application No. GB1403408.6, dated Aug. 8, 2014.

Search Report for Application No. GB1403471.4, dated Sep. 9, 2014.

Search Report for Application No. GB1403472.2, dated Aug. 22, 2014.

Search Report for Application No. GB1403474.8, dated Aug. 26, 2014.

Search Report for Application No. GB1403475.5, dated Sep. 3, 2014.

Search Report for Application No. GB1403476.3, dated Aug. 27, 2014.

Search Report for Application No. GB1403477.1, dated Aug. 28, 2014.

Search Report for Application No. GB1403478.9, dated Aug. 21, 2014.

Search Report for Application No. GB1403480.5, dated Aug. 28, 2014.

Search Report for Application No. GB1403615.6, dated Aug. 18, 2014.

Search Report for Application No. GB1403616.4, dated Sep. 1, 2014.

U.S. Appl. No. 14/212,411, filed Mar. 14, 2014, "Determining Associations and Alignments of Process Elements and Measurements in a Process".

U.S. Appl. No. 14/506,863, filed Oct. 6, 2014, "Streaming Data for Analytics in Process Control Systems".

U.S. Appl. No. 62/060,408, filed Oct. 6, 2014, "Data Pipeline for Process Control System Analytics".

(56) References Cited

OTHER PUBLICATIONS

Woo, "Intel Drops a Big Data Shocker", downloaded from the Internet at: http://forbes.com/sites/bwoo/2013/02/27/intel-drops-a-big-data-shocker/?partner.ya dated Feb. 27, 2013.
Adrian et al., "Model Predictive Control of Integrated Unit Operations Control of a Divided Wall Column," Chemical Engineering and Processing: Process Information, 43(3):347-355 (2004).
Daniel et al., "Conceptual Design of Reactive Dividing Wall Columns," Symposium Series No. 152, pp. 364-372 (2006).
Dejanovic et al., "Conceptual Design and Comparison of Four-Products Dividing Wall Columns for Separation of a Multicomponent Aromatics Mixture," Distillation Absorption, pp. 85-90 (2010).
Dongargaonkar et al., "PLC Based Ignition System," Conference Records of the 1999 IEEE Industry Application Conference, 1380-1387 (1999).
Hiller et al., "Multi Objective Optimisation for an Economical Dividing Wall Column Design," Distillation Absorption, pp. 67-72 (2010).
International Preliminary Report on Patentability for Application No. PCT/US2014/030627, dated Sep. 15, 2015.
International Preliminary Report on Patentability for Application No. PCT/US2015/020148, dated Sep. 14, 2016.
Kiss et al., "A control Perspective on Process Intensification in Dividing-Wall Columns," Chemical Engineering and Processing: Process Intensification, 50:281-292 (2011).
Pendergast et al., "Consider Dividing Wall Columns," Chemical Processing (2008). Retrieved from the Internet at: URL:http://www.chemicalprocessing.com/articles/2008/245/?show=all.
Sander et al., "Methyl Acetate Hydrolysis in a Reactive Divided Wall Column," Symposium Series No. 152, pp. 353-363 (2006).
Schultz et al., "Reduce Costs with Dividing-Wall Columns," Reactions and Separations, pp. 64-71 (2002).
Shah et al., "Multicomponent Distillation Configurations with Large Energy Savings," Distillation Absorption, pp. 61-66 (2010).
Thotla et al., "Cyclohexanol Production from Cyclohexene in a Reactive Divided Wall Column: A Feasibility Study," Distillation Absorption, pp. 319-324 (2010).
Tututi-Avila et al., "Analysis of Multi-Loop Control Structures of Dividing-Wall Distillation Columns Using a Fundamental Model," Processes, 2:180-199 (2014).
U.S. Office Action for U.S. Appl. No. 13/784,041 dated Apr. 6, 2015.
U.S. Office Action for U.S. Appl. No. 13/784,041, dated Feb. 26, 2016.
U.S. Office Action for U.S. Appl. No. 13/784,041, dated Oct. 15, 2015.
Search Report for Application No. GB1513617.9, dated Jan. 21, 2016.
International Search Report and Written Opinion for Application No. PCT/US2015,053931, dated Jan. 26, 2016.
Krumeich et al., "Big Data Analytics for Predictive Manufacturing Control—A Case Study from Process Industry," IEEE International Congress on Big Data, pp. 530-537 (2014).
Bassat et al., "Workflow Management Combined with Diagnostic and Repair Expert System Tools for Maintenance Operations," IEEE, pp. 367-375 (1993).
Search Report for Application No. GB1501042.4, dated Feb. 2, 2016.
Search Report for Application No. GB1517034.3, dated May 26, 2016.
Search Report for Application No. GB1517038.4, dated Mar. 22, 2016.
Examination Report for Application No. EP 14724871.0, dated Aug. 17, 2016.
"IoT and Big Data Combine Forces," (2013). Retrieved from the Internet at: URL:http://wiki.advantech.com/images/7/73/iot2013_whitepaper.pdf.
Bryner, "Smart Manufacturing: The Next Revolution," Chemical Engineering Process (2012). Retrieved from the Internet at: URL:http://www.aiche.org/sites/default/files/cep/20121004a.pdf.

Building Smarter Manufacturing with the Internet of Things (IoT), (2014). Retrieved from the Internet at: URL:http://www.cisco.com/web/solutions/trends/iot/iot_in_manufacturing_january.pdf.
International Search Report and Written Opinion for Application No. PCT/US2015/020148, dated Jun. 18, 2015.
Smalley, "GE Invests in Project to Embed Predictive Analytics in Industrial Internet," (2013). Retrieved from the Internet at: URL:http://data-informed.com/ge-invents-in-proiect-to-embed-predictive-analytics-in-industrial-internet/.
U.S. Appl. No. 14/174,413, entitled "Collecting and Delivering Data to a Big Data Machine in a Process Control System", filed Feb. 6, 2014, 61 pages.
U.S. Appl. No. 14/212,493, entitled "Distributed Big Data in a Process Control System", filed Mar. 14, 2014, 61 pages.
Communication Relating to the Results of the Partial International Search, dated Jul. 11, 2014.
International Search Report and Written Opinion for Application No. PCT/US2014/030627, dated Sep. 11, 2014.
U.S. Appl. No. 13/784,041, filed Mar. 4, 2013.
U.S. Appl. No. 14/028,785, filed Sep. 17, 2013.
U.S. Appl. No. 14/028,897, filed Sep. 17, 2013.
U.S. Appl. No. 14/028,913, filed Sep. 17, 2013.
U.S. Appl. No. 14/028,921, filed Sep. 17, 2013.
U.S. Appl. No. 14/028,923, filed Sep. 17, 2013.
U.S. Appl. No. 14/028,964, filed Sep. 17, 2013.
Hu et al., "Toward Scalable Systems for Big Data Analytics: A Technology Tutorial," IEEE, 2:652-687 (2014).
Lee et al., "Recent Advances and Trends in Predictive Manufacturing Systems in Big Data Environment," Manufacturing Letters, 1(1):38-41 (2013).
Mahdavi et al., "Development of a Simulation-Based Decision Support System for Controlling Stochastic Flexible Job Shop Manufacturing Systems," Simulation Modeling Practice and Theory, 18:768-786 (2010).
Mezmaz et al., "A Parallel Bi-Objective Hybrid Metaheuristic for Energy-Aware Scheduling for Cloud Computing Systems," Journal of Parallel and Distributed Computing, Elsevier (2011).
Notification of First Office Action for Chinese Application No. 201480014734.3, dated Apr. 19, 2017.
Razik et al., "The Remote Surveillance Device in Monitoring and Diagnosis of Induction Motor by Using a PDA," IEEE (2007).
Search Report for Application No. GB1617019.3, dated Feb. 27, 2017.
Siltanen et al., "Augmented Reality for Plant Lifecycle Management," IEEE (2007).
Xu, "From Cloud Computing to Cloud Manufacturing," Robotics and Computer-Integrated Manufacturing 28:75-86 (2012).
Bruzzone et al., "Different Modeling and Simulation Approaches Applied to Industrial Process Plants," Proceedings of the Emerging M&S Applications in Industry & Academia/Modeling and Humanities Symposium (2013).
First Office Action for Chinese Application No. 201410097675.2, dated May 10, 2017.
International Preliminary Report on Patentability for Application No. PCT/US2015/053931, dated Apr. 11, 2017.
Notification of First Office Action for Chinese Application No. 201410097875.8, dated Jul. 7, 2017.
Sailer et al., "Attestation-Based Policy Enforcement for Remote Access," Proceedings of the 11th ACM Conference on Computer and Communications Security (2004).
Search Report for Application No. GB1617020.1, dated Apr. 13, 2017.
Search Report for Application No. GB1617021.9, dated Apr. 5, 2017.
Search Report for Application No. GB1617022.7, dated Apr. 18, 2017.
Search Report for Application No. GB1617023.5, dated Apr. 7, 2017.
Search Report for Application No. GB16702014.0, dated Aug. 3, 2017.
Sunindyo et al., "An Event-Based Empirical Process Analysis Framework," ESEM (2010).

(56) References Cited

OTHER PUBLICATIONS

Extended European Search Report for Application No. 17157505.3, dated Jun. 30, 2017.
First Office Action for Chinese Application No. 201410080524.6, dated Sep. 13, 2017.
First Office Action for Chinese Application No. 201410088828.7, dated Aug. 1, 2017.
First Office Action for Chinese Application No. 201410097623.5, dated Sep. 26, 2017.
First Office Action for Chinese Application No. 201410097873.9, dated Aug. 9, 2017.
First Office Action for Chinese Application No. 201410097874.3, dated Aug. 18, 2017.
First Office Action for Chinese Application No. 201410097921.4, dated Oct. 10, 2017.
First Office Action for Chinese Application No. 201410097922.9, dated Aug. 18, 2017.
First Office Action for Chinese Application No. 201410097923.3, dated Aug. 28, 2017.
First Office Action for Chinese Application No. 201410098326.2, dated Jul. 27, 2017.
First Office Action for Chinese Application No. 201410098327.7, dated Jul. 26, 2017.
First Office Action for Chinese Application No. 201410098982.2, dated Aug. 9, 2017.
First Office Action for Chinese Application No. 201410099103.8, dated Aug. 9, 2017.
Notice of Reasons for Rejection for Japanese Application No. 2014-051599, dated Nov. 28, 2017.
Notification of First Office Action for Chinese Application No. 201410099068.X, dated Sep. 15, 2017.
Notice of Reasons for Rejection for Japanese Application No. 2014-041785, dated Dec. 5, 2017.
Notice of Reasons for Rejection for Japanese Application No. 2014-041785, dated Nov. 30, 2017.
Notice of Reasons for Rejection for Japanese Application No. 2014-048411, dated Dec. 5, 2017.
Notice of Reasons for Rejection for Japanese Application No. 2014-048412, dated Feb. 27, 2018.
Notice of Reasons for Rejection for Japanese Application No. 2014-049916, dated Feb. 27, 2018.
Notice of Reasons for Rejection for Japanese Application No. 2014-049917, dated Mar. 6, 2018.
Notice of Reasons for Rejection for Japanese Application No. 2014-049918, dated Dec. 12, 2017.
Notice of Reasons for Rejection for Japanese Application No. 2014-049919, dated Nov. 29, 2017.
Notice of Reasons for Rejection for Japanese Application No. 2014-049920, dated Feb. 20, 2018.
Notice of Reasons for Rejection for Japanese Application No. 2014-051114, dated Dec. 28, 2017.
Notice of Reasons for Rejection for Japanese Application No. 2014-051595, dated Jan. 16, 2018.
Notice of Reasons for Rejection for Japanese Application No. 2014-051596, dated Jan. 16, 2018.
Notice of Reasons for Rejection for Japanese Application No. 2014-051596, dated Jan. 9, 2018.
Notice of Reasons for Rejection for Japanese Application No. 2014-051597, dated Jan. 9, 2018.
Notice of Reasons for Rejection for Japanese Application No. 2014-051598, dated Mar. 13, 2018.
Second Office Action for Chinese Application No. 201410097922.9, dated Jan. 9, 2018.
Decision of Refusal for Japanese Application No. 2014-048410, dated May 29, 2018.
Decision of Rejection for Chinese Application No. 201410097675.2, dated Jul. 2, 2018.
Examination Report for Application No. EP 14724871.0, dated Aug. 10, 2018.
First Office Action for Chinese Application No. 201510113223.3, dated Jul. 4, 2018.
First Office Action for Chinese Application No. 201580014241.4, dated Jun. 22, 2018.
Notice of Reasons for Rejection for Japanese Application No. 2014-048411, dated Jul. 31, 2018.
Notice of Reasons for Rejection for Japanese Application No. 2014-049919, dated Jul. 31, 2018.
Notice of Reasons for Rejection for Japanese Application No. 2014-049920, dated Jun. 5, 2018.
Notice of Reasons for Rejection for Japanese Application No. 2014-051595, dated May 29, 2018.
Notice of Reasons for Rejection for Japanese Application No. 2014-051596, dated May 29, 2018.
Second Office Action for Chinese Application No. 201410097623.5, dated Jun. 26, 2018.
Second Office Action for Chinese Application No. 201410097872.4 dated Jul. 12, 2018.
Second Office Action for Chinese Application No. 201410097921.4, dated Jul. 5, 2018.
Second Office Action for Chinese Application No. 201410098326.2, dated Jun. 19, 2018.
Second Office Action for Chinese Application No. 201410098982.2, dated Jun. 11, 2018.
Second Office Action for Chinese Application No. 201410099068.X, dated Jun. 14, 2018.
Second Office Action for Chinese Application No. 201410099103.8, dated Jun. 5, 2018.
Third Office Action for Chinese Application No. 201410097922.9, dated Aug. 3, 2018.
Final Rejection for Japanese Application No. 2014-048410, dated May 29, 2018.
First Office Action for Chinese Application No. 201410097872.4, dated Aug. 23, 2017.
First Office Action for Chinese Application No. 201510049715.0, dated May 4, 2018.
Notice of Reasons for Rejection for Japanese Application No. 2014-049915, dated Mar. 13, 2018.
Notice of Reasons for Rejection for Japanese Application No. 2014-049918, dated Apr. 10, 2018.
Notice of Reasons for Rejection for Japanese Application No. 2016-503431, dated Apr. 3, 2018.
Second Office Action for Chinese Application No. 201410088828.7, dated Apr. 27, 2018.
Second Office Action for Chinese Application No. 201410097675.2, dated Feb. 11, 2018.
Second Office Action for Chinese Application No. 201410097873.9, dated May 15, 2018.
Second Office Action for Chinese Application No. 201410097875.8, dated Jun. 6, 2018.
Second Office Action for Chinese Application No. 201410098327.7, dated Feb. 27, 2018.

* cited by examiner

AUTOMATIC SIGNAL PROCESSING-BASED LEARNING IN A PROCESS PLANT

CROSS REFERENCE TO RELATED APPLICATIONS

The present disclosure is related to U.S. patent application Ser. No. 13/784,041, entitled "BIG DATA IN PROCESS CONTROL SYSTEMS" and filed Mar. 3, 2013; U.S. patent application Ser. No. 14/028,785, entitled "METHOD AND APPARATUS FOR CONTROLLING A PROCESS PLANT WITH LOCATION AWARE MOBILE CONTROL DEVICES" and filed on Sep. 17, 2013; U.S. patent application Ser. No. 14/174,413, entitled "COLLECTING AND DELIVERING DATA TO A BIG DATA MACHINE IN A PROCESS CONTROL SYSTEM" and filed Feb. 6, 2014; U.S. patent application Ser. No. 14/212,493, entitled "DISTRIBUTED BIG DATA IN A PROCESS CONTROL SYSTEM" and filed Mar. 14, 2014; and U.S. patent application Ser. No. 14/212,411, entitled "DETERMINING ASSOCIATIONS AND ALIGNMENTS OF PROCESS ELEMENTS AND MEASUREMENTS IN A PROCESS" and filed Mar. 14, 2014, the entire disclosures of each of which are hereby expressly incorporated by reference.

Additionally, the present disclosure is related to U.S. patent application Ser. No. 14/507,188, entitled "REGIONAL BIG DATA IN PROCESS CONTROL SYSTEMS", filed concurrently herewith, and issued as U.S. Pat. No. 9,823,626; U.S. Patent Application No. 62/060,408, entitled "DATA PIPELINE FOR PROCESS CONTROL SYSTEM ANALYTICS" and filed concurrently herewith; and U.S. patent application Ser. No. 14/506,863, entitled "STREAMING DATA FOR ANALYTICS IN PROCESS CONTROL SYSTEMS" and filed concurrently herewith, the entire disclosures of each of which are hereby expressly incorporated by reference.

TECHNICAL FIELD

The present disclosure relates generally to process plants and to process control systems, and more particularly, to providing automatic, autonomous learning within a process plant based on close-to-the source signal processing performed on real-time data generated by process plants and process control systems.

BACKGROUND

Distributed process control systems, like those used in chemical, petroleum, industrial or other process plants to manufacture, refine, transform, generate, or produce physical materials or products typically include one or more process controllers communicatively coupled to one or more field devices via analog, digital or combined analog/digital buses, or via a wireless communication link or network. The field devices, which may be, for example, valves, valve positioners, switches and transmitters (e.g., temperature, pressure, level and flow rate sensors), are located within the process environment and generally perform physical or process control functions such as opening or closing valves, measuring process and/or environmental parameters such as temperature or pressure, etc. to control one or more process executing within the process plant or system. Smart field devices, such as the field devices conforming to the well-known Fieldbus protocol may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART®, WirelessHART®, and FOUNDATION® Fieldbus field devices. The control modules in the controller send the control signals over the communication lines or links to the field devices to thereby control the operation of at least a portion of the process plant or system. For example, the controllers and the field devices control at least a portion of a process being controlled by the process plant or system.

Information from the field devices and the controller is usually made available over a data highway or communication network to one or more other hardware devices, such as operator workstations, personal computers or computing devices, data historians, report generators, centralized databases, or other centralized administrative computing devices that are typically placed in control rooms or other locations away from the harsher plant environment. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths.

As an example, the DeltaV™ control system, sold by Emerson Process Management, includes multiple applications stored within and executed by different devices located at diverse places within a process plant. A configuration application, which resides in one or more workstations or computing devices, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration designer to create or change operator interfaces which are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

In a process plant or process control system, when evidence of an abnormal condition or fault occurs (e.g., when an alarm is generated, or when a process measurement or actuator is found to have excessive variation), an operator, instrument technician or process engineer typically uses an analytics tool in combination with his or her knowledge of the process being controlled by the system and its flow path through the system to attempt to determine upstream measurements and process variables that may have contributed to the production of the evidence of the abnormal condition or fault. For example, an operator may feed a historical log of data that has been captured over time from the output of a process control device (e.g., a field device, a controller, etc.) into the DeltaV™ batch analytics product or continuous data analytics tool to attempt to determine the contributions of various process variables and/or measurements to an abnormal or fault condition. Typically, a user decides which historical data logs to feed into the analytics tool and identifies candidate upstream factors (e.g., measurements, process variables, etc.) based on his or her knowledge of the process. Subsequently, these data analytics tools utilize principal component analysis (PCA) to determine which of the candidate upstream factors impact downstream predicted quality parameters. Thus, the accuracy and effectiveness of the output provided by the analytics tool is based on or limited to the user's knowledge, and as such may not provide complete or correct insight into the sources of the abnormal condition or fault.

Additionally, the architecture of currently known process control plants and process control systems is strongly influenced by limited controller and device memory, communications bandwidth and controller and device processor capability. For example, in currently known process control system architectures, the use of dynamic and static non-volatile memory in the controller is usually minimized or, at the least, managed carefully. As a result, during system configuration (e.g., a priori), a user typically must choose which data in the controller is to be archived or saved, the frequency at which it will be saved, and whether or not compression is used, and the controller is accordingly configured with this limited set of data rules. Consequently, data which could be useful in troubleshooting and process analysis is often not archived, and if it is collected, the useful information may have been lost due to data compression.

The limitations of currently known process plants and process control systems discussed above and other limitations may undesirably manifest themselves in the operation and optimization of process plants or process control systems, for instance, during plant operations, trouble shooting, and/or predictive modeling. For example, such limitations force cumbersome and lengthy work flows that must be performed in order to obtain historical data for troubleshooting, manually feeding the data into stand-alone, off-line signal processing tools, and manually supervising the analysis of the output of the signal processing tools to generate updated models. Even then, the troubleshooting results and models may be incomplete or not fully representative of the actual system, as the inputs to their generation rely on a particular operator's experience and knowledge.

"Big data" generally refers to a collection of one or more data sets that are so large or complex that traditional database management tools and/or data processing applications (e.g., relational databases and desktop statistic packages) are not able to manage the data sets within a tolerable amount of time. Typically, applications that use big data are transactional and end-user directed or focused. For example, web search engines, social media applications, marketing applications and retail applications may use and manipulate big data. Big data may be supported by a distributed database which allows the parallel processing capability of modern multi-process, multi-core servers to be fully utilized.

SUMMARY

Techniques, systems, apparatuses, and methods for providing signal processing-based learning to determine potential sources of faults, abnormal operations, and/or variations in the behavior of signals generated by controlling a process in a process plant are disclosed. The signal processing-based learning may be, for example, a type of big data based learning. Generally, said techniques, systems, apparatuses, and methods automatically perform, without any user input, signal processing on one or more signals that are generated based on the control of the process to determine one or more characteristics of the one or more signals. Typically, the signal processing is integrated into the process plant, and is performed close to the source of the one or more signals in real-time as the data is generated by the signal source or sources. Additionally or alternatively, said techniques, systems and methods automatically determine, without any user input, one or more sources that contribute to the characteristics found in the behavior of the one or more signals as a result of the signal processing. The one or more signals may be, for example, indicative of a value over time of an output signal of a process control device, a process variable, a measurement, a balance of energy, a balance of mass, a performance parameter, an output of an analytics function, and/or any other value that is generated based on the process being controlled in the process plant. The one or more sources of the characteristics may include, for example, a process control device, a process variable, a measurement, another process element, a piece of equipment, an asset of the process plant, etc.

In an embodiment, a system for providing big data based learning in a process plant controlling a process includes a signal processing module having an input and an output. The input of the signal processing module is to receive a signal generated by a signal source associated with the process plant as the signal source generates the signal in real-time, where the signal is indicative of a parameter value that varies over time based on the process plant controlling the process by using at least one field device that performs a physical function. The output of the signal processing module is to provide, to a recipient application, an indication of at least one characteristic of the signal. Additionally, the signal processing module is configured to perform signal processing on the signal to determine the at least one characteristic of the signal.

In an embodiment, a system for automatically performing big data based learning in a process plant controlling a process includes a signal processing module and an analytics module. The signal processing module is configured to receive a signal generated by a signal source as the signal source generates the signal in real-time, where the signal is indicative of a value of a parameter that varies over time based on the process plant controlling the process by using at least one field device performing a respective physical function. The signal processing module is further configured to perform signal processing on the signal to determine one or more characteristics of the signal. The analytics module is configured to receive an indication of the one or more characteristics determined by the signal processing module and determine one or more sources of the one or more characteristics of the signal, where the one or more sources are one or more members of a set of elements that are upstream, within the process, of the signal, and each of the one or more members of the set of upstream elements has a respective impact on the one or more characteristics of the signal that is greater than a respective impact of at least one other member of the set of upstream elements that is not included in the one or more members. The analytics module is further configured to cause an indication of the one or more sources of the one or more characteristics of the signal to be provided to a recipient application, where the recipient application is a user interface application or another application.

In an embodiment, a method for providing big data based-learning in a process plant controlling a process includes obtaining, at a signal processing-based learning system, indications of variations over time of a value of a parameter, where the variations over time of the parameter value are a signal generated by a signal source, the variations over time of the parameter value are generated based on controlling the process in the process plant, and the signal is obtained as the signal source generates the signal in real-time. Additionally, the method includes causing, by the signal processing-based learning system, one or more signal processing functions to be applied to the signal, and determining, by the signal processing-based learning system, at least one characteristic of the signal based on the application of the one or more signal processing functions. Further, the method includes determining, by the signal processing-based learning system, at least a subset of a set of elements that are upstream, within the process, of the signal to be one or more sources of the at least one characteristic of the signal, where the determination of the at least the subset is based on respective strengths of impact of the set of upstream elements on the at least one characteristic of the signal. Still further, the method includes causing, by the signal processing-based learning system, an indication of the one or more sources of the at least one characteristic of the signal to be provided to a recipient application, the recipient application being a user interface application or another application.

DETAILED DESCRIPTION

Figure 1:
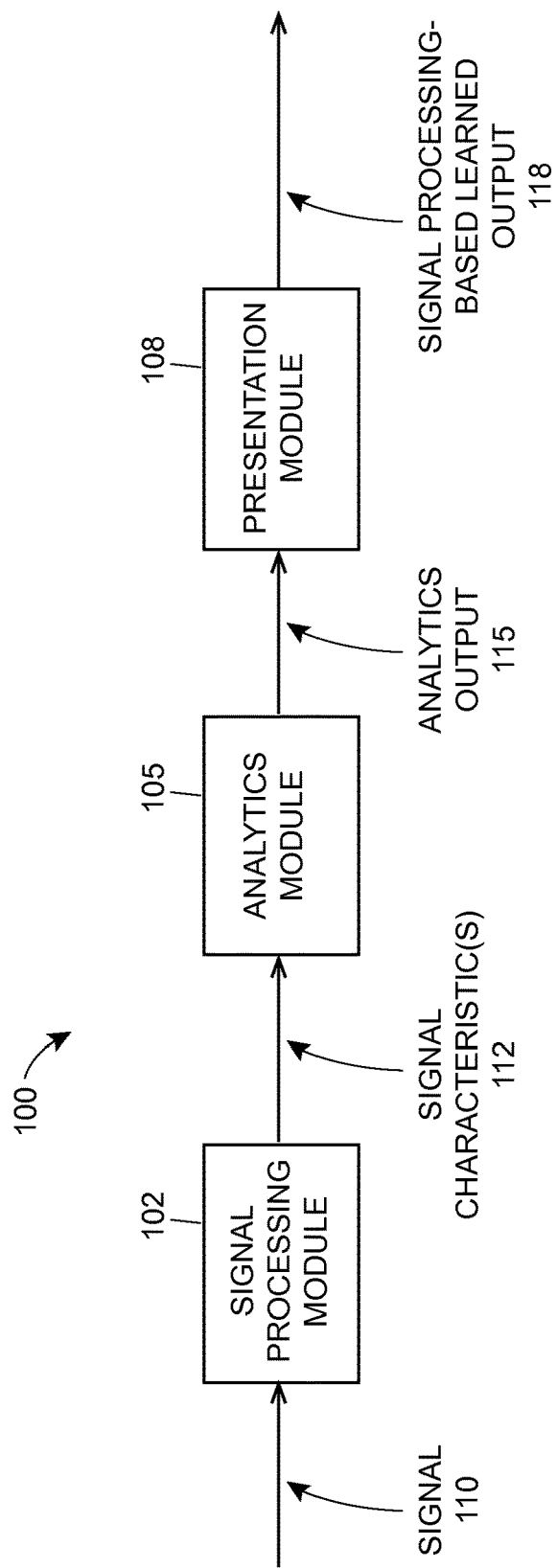
FIG. 1 depicts an example system for providing automatic or autonomous signal processing-based learning in a process plant or process control system.

Techniques, systems, and methods for automatically or autonomously performing signal processing-based learning in a process plant or process control system are disclosed herein. Generally, said techniques, systems and methods enable signal processing to be automatically or autonomously performed on or applied to a signal that is generated as a result of the process plant controlling a process. Typically, the signal is indicative of a parameter value that varies over time based on the controlling of the process. Thus, as used herein, the term "signal" generally refers to a time series of a parameter value, e.g., a time series of an output of a controller, a time series of a disturbance variable, etc. In contrast with known process control signal processing techniques in which a user obtains a historical signal feed from a process plant a posteriori and provides the historical signal feed into an off-line, separate signal processor, the present techniques, systems, and methods allow one or more signal processing functions to be integrated into the process plant or process control system so that signal processing is performed autonomously in real-time as the signal is generated by a signal source in real-time. Thus, by using the techniques, systems, and methods disclosed herein, signal processing is incorporated or integrated into operating, on-line process plants or systems, e.g., by positioning or locating various signal processing functions near to various signal sources within the process plant or system. Indeed, in some embodiments, one or more signal processing functions are integral or integrated with a signal source. The integrated or incorporated signal processing functions autonomously execute in real-time on the real-time signals generated by signal sources as a result of the real-time operations of the on-line process plant or system.

It is noted that the techniques, systems and methods discussed herein may be applied to single signal, to multiple signals respectively, and/or to multiple signals as a group or as a whole. However, for ease of discussion herein and not for limitation purposes, the singular term "signal" is utilized.

The execution of the one or more signal processing functions (e.g., the application of the one or more signal processing functions to a real-time signal) may generate results that indicate one or more characteristics of the signal. For example, one or more dominant frequencies or harmonics that are present in the signal may be determined by the application of the one or more signal processing functions. In some process plants or process control systems, the characteristic(s) of the signal are provided to one or more analytics functions that also operate automatically or autonomously during the real-time operations of the process plant. The analytics function(s) may determine one or more sources of the characteristic(s) of the signal, e.g., based on an element alignment map or similar resource that indicates or identifies elements (e.g., process elements) that are upstream, in the process, of the signal source.

Examples of element alignment maps and upstream elements are described in aforementioned U.S. patent application Ser. No. 14/212,411. Generally, an element alignment map or similar resource indicates all elements and/or process elements (e.g., a complete or comprehensive set of process variables, process measurements, process devices, other process elements, equipment, assets, etc.) that have a role during the real-time control of the process during normal operations of the process plant, e.g., by taking a measurement, performing a physical function or causing another element to perform a physical function, controlling a variable, providing a value to another process element to control a variable, generating dynamic data, receiving and operating on dynamic data, physically supporting process control devices or other equipment, routing messages, and the like. Additionally, the element map indicates a relative location or positioning of each element with respect to the other elements within the flow of the process.

The element map alignment may be automatically determined (e.g., determined without using or requiring any user input), for example, by extracting or obtaining identifications, physical locations within the process plant, and, optionally, other descriptive information of process plant elements from multiple data sources. The extracted or obtained data may then be automatically ordered to reflect the relative sequence of activation or active participation of the primary elements while the process is being controlled during run-time. Thus, for each primary element indicated in the element alignment map, the map includes an indication of an order of participation or activation of that primary element (e.g., with respect to an order of participation or activation of another primary element) while the process is being controlled, and these relative orders or positions within the element alignment map may be described or indicated accordingly. For example, an element corresponding to a first valve that is controlled to release raw input materials into a tank for initial processing is ordered in the element alignment map ahead of (e.g., is "upstream of") an element corresponding to a second valve that is controlled to release the final product or output of the process into a holding area to await packaging. Conversely, the second valve is ordered after or is "downstream" of the first valve within the process element alignment map of the process.

Accordingly, by using the element alignment map or similar resource, an analytics function or routine may determine one or more potential sources of the one or more characteristics of the signal that were determined by the signal processing functions. For example, the analytics function or routine may identify one or more upstream elements of the signal source using the element alignment map, and then may determine a subset of the identified, upstream elements to be the one or more sources of the characteristics based on a comparison of the respective strengths of impact of the identified, upstream elements on the characteristics of the signal. In an embodiment, respective strengths of impact of various upstream on the one or more characteristics are determined based on historical process control data.

These and other techniques, systems, and methods for automatically or autonomously providing signal processing-based learning in a process control system or plant are discussed in more detail below.

FIG. 1 illustrates an example system 100 for providing automatic or autonomous signal processing-based learning in a process plant or process control system. The signal processing-based learning may be, for example, a type of big data based learning. As shown in FIG. 1, the signal processing-based learning system 100 includes a signal processing module 102 that is communicatively coupled to an analytics module 105 that, in turn, is coupled to a presentation module 108. In some configurations, the signal processing module 102 may also be directly communicatively coupled to the presentation module 108, although such a configuration is not shown in FIG. 1.

In FIG. 1, the signal processing module 102 is particularly configured to perform signal processing on a signal 110 to determine one or more characteristics of the signal 110. In particular, the signal processing module 102 receives, as an input, an indication of a signal 110 generated by the process plant, where the signal is indicative of variations over time of a value of a parameter associated with the process plant. The variations of the parameter value over time generally are due to or are a result of the process being controlled by the on-line process plant (or by the on-line portion thereof associated with the parameter). In some situations, some of the variations in the parameter value are oscillatory (e.g., over time, around a central value or point of equilibrium, between two or more different states, etc. In some situations, some of the variations in the parameter value are not oscillatory (e.g., impulse responses, aperiodic behavior, etc.).

The signal 110 is generated by one or more process elements and/or other components or functions corresponding to the process plant or process control system, which are referred to herein as the "source" of the signal or the "signal source." For example, the source of the signal 110 may correspond to an input signal or an output signal of a process control device (e.g., of a controller, field device, or input/output (I/O) device). Additionally or alternatively, the source of the signal 110 may be a process variable such as a control variable, a manipulated variable, a disturbance variable, etc. (which may be an input or an output of a process control device). In most (but not necessarily all) cases, the source of the signal 110 is a measurement. Examples of measurements may include a process measurement that is directly performed by a field device on some parameter of the process, or that is derived from such a direct measurement; an environmental measurement that is generally independent of control of the process (e.g., an ambient temperature or air pressure, a composition of a raw input material, etc.); a performance measurement (e.g., a process plant communication link bandwidth or delay, a composition of the output of the process plant, etc.), or some other measurement associated with the process plant controlling the process. In some cases, the source of the signal 110 is a parameter that is indicative of a balance of mass or a balance of energy within a portion of the process or process plant. In some cases, the source of the signal 110 corresponds to an output of another analytics system or module. It is noted that while a single signal 110 may correspond to multiple signal sources (for example, the signal 110 may reflect the changing output value of an analysis that is being performed on an output of a controller), for ease of readability, the "source" of the signal 110 or the "signal source" is referred to herein in the singular tense.

Generally, the signal 110 may correspond to any set of one or more parameters that is associated with the process plant and that has a value that varies as a direct or indirect result of the process plant controlling the process, e.g., that varies in real-time or that varies as a direct or indirect result of the process plant (or the portion thereof with which the parameter is associated) is operating on-line. As shown in FIG. 1, the signal 110 is obtained and processed by the signal processing module 102 in real-time. That is, the signal 110 is obtained and processed by the signal processing module 102 as the signal source generates the signal 110 in real-time. In some situations, the processing of the signal 110 by the signal processing module 102 may be slightly delayed, for example, if the signal processing module 102 is designated to run in the background or at a lower priority than the source of the signal or other modules that are more critical to controlling the process.

In an embodiment, the signal processing module 102 and the signal source are integral. For example, the signal processing module 102 may be included in a controller or in a field device such as a valve or sensor. In another embodiment, the signal processing module 102 may be separate from but communicatively connected to the signal source. For instance, the signal processing module 102 may be physically attached or coupled to the signal source so that the output of the signal source traverses the signal processing module 102 prior to being transmitted over a process control network, or the signal processing module 102 may monitor the network link over which the output of the signal source is transmitted. For example, the signal processing module 102 may be included in an adjunct device that is coupled to a controller, a field device, or a communication link via which the controller and/or the field device transmits signals.

The signal processing module 102 may passively or actively receive or obtain the output signal of the signal source. For example, when a controller directly sends its output to the signal processing module 102 (e.g., when the signal processing module 102 is attached to the output port of the controller, or the controller explicitly addresses its output to be delivered to the signal processing module 102), the signal processing module 102 passively obtains the output signal of the signal source. On the other hand, when the signal processing module 102 monitors the link on which the output of the controller is transmitted, the signal processing module 102 actively obtains the output signal of the signal source.

In some embodiments (not shown), the signal processing module 102 receives or obtains one or more other inputs in conjunction with the signal 110. For example, the signal processing module 102 may receive multiple, time-varying input signals from multiple respective signal sources. In some situations, the signal processing module 102 receives, in conjunction with the signal 110, one or more additional real-time inputs that are relatively constant over time, such as a setpoint of a control variable or an indication of a static condition within the process plant. In some situations, the signal processing module 102 receives, in conjunction with the signal 110 (and with any additional real-time inputs, if present), one or more other inputs that are not generated during real-time operations of the process plant, such as measurements that were obtained while the process plant or portion thereof was off-line, an output generated by an off-line, manual analytics tool, data obtained from a model of one or more portions of the process, etc. The signal processing module 102 may receive the multiple, real-time and/or non-real-time additional inputs passively (e.g., when each signal source causes its signal to be delivered to the signal processing module 102), or the signal processing module 102 may receive the multiple, real-time and/or non-real-time additional inputs actively, (e.g., when the signal processing module 102 monitors several data feeds from the multiple signal sources corresponding to the multiple inputs).

In FIG. 1, the signal processing module 102 operates on the signal 110 (and any other additional constant or varying inputs, if present) to determine one or more characteristics of the signal 110. Typically, the signal processing module 102 operates in an unsupervised manner. That is, the signal processing module 102 initiates and executes one or more signal processing functions or operations automatically, autonomously, and/or independent of any user input. For example, the signal processing module 102 does not require a user or operator to provide a log or feed of the signal 110 into its input, or to indicate the particular signal processing functions that are to be performed on its inputs, or to initiate the execution of the signal processing functions or operations.

Indeed, the signal processing module 102 automatically or autonomously performs one or more signal processing functions on the signal 110 to determine one or more characteristics of the signal 110. For example, the signal processing module 102 may perform filtering, magnitude or amplitude analysis, power analysis, intensity analysis, phase analysis, frequency analysis, spectrum or spectral analysis, correlation analysis, convolution, smoothing, Hilbert transformation, level detection, linear signal processing, non-linear signal processing, and/or any other signal processing technique on the signal 110. Thus, it follows that the one or more characteristics that are determined by the signal process module 102 correspond to the set of signal processing techniques that have been applied by the signal processing module 102 to the signal 110. For example, if the signal processing module 102 performs spectrum analysis on the signal 110, the one or more corresponding characteristics of the signal 110 that are determined from the spectrum analysis may include an identification of one or more dominant frequencies within the signal 110, one or more n-th order frequencies (where n is an integer greater than one), a harmonic, a subharmonic, a bifurcation, bandwidth, distortion, etc. In another example, if the signal processing module 102 performs a phase analysis on the signal 110, the one or more corresponding characteristics of the signal 110 may include an identification of one or more phases of the signal 110 and/or of the presence or absence of any phase shifting. It is noted that while the above spectrum and phase analysis examples illustrate characteristics of one or more repetitive behaviors (e.g., oscillatory or periodic behaviors) that are included in the signal 110, the signal processing module 102 may additionally or alternatively operate on the signal 110 to determine any non-repetitive behaviors are present, such as maximum and minimum amplitude over time, impulse responses, etc. In an embodiment, the signal processing module 102 may select one or more signal processing functions to perform on the obtained signal, e.g., based on the source of the signal, additional inputs, one or more previously determined characteristics of the obtained signal or of another signal, and/or some other criteria.

Thus, in FIG. 1, the signal processing module 102 applies one or more signal processing functions to the signal 110, determines the one or more characteristics of the signal 110 based on the applied signal processing, and provides an indication 112 of said determined characteristics to the analytics module 105. The analytics module 105 is particularly configured to determine the potential source or sources of the determined characteristics of the signal 110, e.g., the analytics module 105 determines the "characteristic source." Specifically, the analytics module 105 determines a set of elements that are upstream of the signal source, and identifies which of those upstream elements have the most significant impact on the variations in the behavior of the signal 110.

Generally, as referred to herein and as previously discussed, the term "upstream element" refers to a process element, a piece of equipment, or an asset of the process plant that is involved during run-time in causing the process plant to control the process. As used herein, the term "upstream" refers to having an earlier, active participation in or presence during control of the process in real-time, and the term "downstream" refers to having a later, active participation in or presence during control of the process in real-time. For example, a vat that stores raw material for input into the process is upstream of a boiler that heats the raw material, and is upstream of a temperature sensor that measures the temperature of the boiler. The term "process element," as used herein, generally refers to a physical or logical element that is used to the control of the process or a portion thereof, such as a process control device, a process variable, a measurement, and the like. Thus, using the vat and boiler example, a valve to release the raw material into the boiler is an upstream process element, the temperature sensor is a process element that is downstream of the valve, and another valve to release the heated flow into a pipe for delivery to another piece of equipment is a process element that is downstream of both the first valve and the temperature sensor.

A "piece of equipment," "equipment piece," or "equipment," as used interchangeably herein, generally refers to a physical element or component which may or may not be directly utilized during control of the process or portion thereof, but nonetheless may be ordered with other equipment pieces and/or process elements with respect to the control or flow of the process. To continue with the above example, the vat and physical supports for the vat are elements that are upstream of the boiler, and the boiler and the supports for the boiler are upstream of the piping that exits the boiler. An "asset" of a process plant, as referred to herein, may be any element corresponding to the process plant having a cost to the provider and/or operator of the process plant. For example, assets of a process plant may include instrumentation, valves, controllers, distributed control systems (DCSs), software, infrastructure, networks, control strategies, applications, configurations, piping, test equipment, configuration equipment, workstations, user interface devices, data storage entities, and the like. Returning again to the vat and boiler example, the vat, boiler, valves, piping, temperature sensor and corresponding supports are assets of the process plant, as are the control modules and strategies that use the valves and temperature sensor to control the heating and the amount of the material in the boiler, as is a portable diagnostic device used to diagnose fault conditions in the vat and/or boiler.

Accordingly, the analytics module 105 of FIG. 1 is configured to operate on the indication 112 of the one or more characteristics of the signal 110 and determine that one or more elements that are upstream of the signal source are the potential, possible, or actual sources of the one or more characteristics. Typically, similar to the signal processing module, the analytics module 105 operates in an unsupervised manner. That is, the analytics module 105 initiates and executes autonomously without any user input, and/or initiates and executes independently of any user input. For example, the analytics module 105 does not require a user or operator to provide the indication 112 of the one or more characteristics of the signal 110, nor does the analytics module 105 require the user or operator to indicate the candidate upstream elements of the signal source.

Rather, the analytics module 105 may automatically determine a set of elements that are adjacent to or upstream of the signal source within the process, e.g., determines a set of upstream elements with respect to the signal source. In an embodiment, the analytics module 105 automatically determines the upstream elements of the signal source using an element alignment map. Generally, as used herein and as previously discussed, an "element alignment map" includes indications of elements and their relative locations or order with respect to a flow of the process in the process plant. Thus, utilizing the vat and boiler example above, a corresponding element alignment map may indicate the relative positioning or order of the vat, boiler, valves, temperature sensor, piping, supports, and other elements with respect to the flow of the process. Upon reception of the indication 112 of the one or more characteristics of the signal 110, the analytics module 105 may automatically generate the element alignment map to determine the upstream elements of the signal source, or the analytics module 105 may query another analytics module or application that is configured to generate and/or provide element alignment maps or portions thereof to determine the upstream elements of the signal source. Examples of determining or generating element alignment maps and of modules/applications configured to generate and/or provide element alignment maps (and/or portions thereof) may be found in aforementioned U.S. patent application Ser. No. 14/212,411. Indeed, any of the methods, systems, and techniques described herein may operate in conjunction with, be included in, or include any number of any of the aspects of U.S. patent application Ser. No. 14/212,411 and/or with other techniques of generating and providing element alignment maps.

Given the portion of the element alignment map corresponding to the signal source, the analytics module 105 determines a subset of the upstream elements to be possible, potential or actual sources of the one or more characteristics of the signal 110. In particular, the analytics module 105 determines the sources of the one or more characteristics of the signal 110 based on a comparison of the respective strengths of impact of the upstream process elements on the one or more characteristics. In an embodiment, the analytics module 105 itself determines the respective strengths of impact of at least some of the upstream process elements on the one or more characteristics of the signal 110. For example, the analytics module 105 may operate on stored, historical data obtained from each of the elements that are upstream of the signal source to estimate the degree of association of each upstream element and the one or more characteristics of the signal 110 (e.g., the strength of impact of each upstream element on the behavior of the one or more characteristics of the signal 110). Alternatively, the analytics module 105 may query a second analytics module or application, and the second analytics module or application determines the respective strengths of impact of the upstream elements on the one or more characteristics of the signal 110.

Subsequently, based on the respective strengths of impact of the upstream elements, the analytics module 105 compares the respective strengths of impact to identify or determine the subset of the set of upstream elements that are the sources of the one or more characteristics of the signal 110. Generally, the upstream elements having respective strengths of impacts on the one or more characteristics that are stronger than are the respective strengths of impacts of other upstream elements on the one or more characteristics may be characteristic sources. That is, each source of the one or more characteristics of the signal 110 may have a respective impact on the one or more characteristics of the signal 110 that is greater than the respective impact of at least one other member of the set of upstream elements that is not a source. The analytics module 105 itself may determine or identify, based on the respective strengths of impact of the upstream elements, the subset of upstream elements that are the characteristic sources of the one or more characteristics of the signal 110, or the analytics module 105 may instruct or ask the second analytics module or application (or a third analytics module or application) to identify, based on the respective strengths of impact of the upstream elements, the subset of upstream elements that are characteristic sources of the one or more characteristics of the signal 110. A total number of sources that are included in the identified set of characteristic sources may be based on a threshold strength of impact, a maximum number of sources to be included in the set, and/or some other boundary criteria, each of which may be configurable. Examples of determining respective strengths of impact of upstream elements and of determining comparing the respective strengths of impact to determine potential source candidates may be found in aforementioned U.S. patent application Ser. No. 14/212,411.

As further illustrated in FIG. 1, the analytics module 105 provides an indication of its output 115 to the presentation module 108. The analytics output 115 includes an indication of the source or sources of the one or more characteristics of the signal 100. In some cases, the analytics output 115 additionally or alternatively includes an indication of the one or more characteristics of the signal 110, indications of the respective strengths of impact of each potential source on each characteristic, an indication of the parameter corresponding to the signal, and/or an identification of the signal source. In some embodiments (not shown), the signal processing module 102 directly provides the indication of the one or more characteristics and/or the indication of the signal source to the presentation module 108. In some embodiments, the presentation module 108 and the analytics module 105 are an integral module.

The presentation module 108 may provide its output 118, which is referred to interchangeably herein as a "signal processing-based learned output" or a "learned output" to one or more other modules and/or applications within the process plant or process control system. The learned output includes the learned information that has been gleaned from the real-time signal processing and an analysis of its output. For example, the output 118 may include an indication of the one or more characteristics of the signal 110, indications of the respective strengths of impact of each source on each characteristic, an indication of the parameter corresponding to the signal, and/or an identification of the signal source. Further, the learned output may include an indication or identification of the signal processing module 102 and/or the analytics module 102, a time stamp indicating a time at which the information was learned, and other indicia. The learned output 118 may be provided to a user interface application for display or presentation. Additionally or alternatively, the learned output 118 may be provided to another analytics module or application as an input on which to operate. In some situations, the learned output 118 is provided for storage or historization at a local or remote data storage entity. The presentation module 108 may receive learned knowledge from the analytics module 105 during or throughout various stages of learning, and may provide the knowledge learned during or throughout the various learning stages to one or more recipient applications, in an embodiment. Further, in some embodiments, the presentation module 108 determines the one or more recipient applications to which a particular learned knowledge is to be provided.

In an example scenario utilizing the system 100, the signal processing module 102 receives one or more measurements provided by one or more process control devices in the process plant or system, and performs a frequency analysis on the one or more measurements. The signal processing module 102 provides the dominant frequencies resulting from the frequency analysis to the analytics module 105. For each dominant frequency, the analytics module 105 determines a respective set of upstream elements, their relationships to each other, and a respective strength of impact of each of the upstream elements on the subject dominant frequency. This learned information (e.g., the one or more measurements, their dominant frequencies, the respective set of upstream elements for each dominant frequency, relationships between the various upstream elements, and the respective strengths of impacts of each upstream element of the dominant frequency) is respectively tagged and stored as learned knowledge at a big data appliance, e.g., as big data and/or corresponding metadata.

Any or all of the systems, methods, and techniques disclosed herein may be utilized in any process plant or process control system that is configured to control a process in real-time. Typically, the process is controlled to manufacture, refine, transform, generate, or produce physical materials or products. The process plant may include, for example, one or more wired communication networks and/or one or more wireless communication networks. Similarly, the process plant may include therein one or more wired process elements and/or one or more wireless process elements. The process plant may include centralized databases, such as continuous, batch and other types of historian databases.

Typically, although not necessarily, the process plants in which at least portions of the system 100 and/or other signal processing-based learning systems, methods, and techniques disclosed herein are utilized include a process control big data network and process control big data network nodes or devices. For example, at least some of the systems, methods, and techniques disclosed herein may be implemented in a process plant that supports localized, regional, and/or centralized big data, such as described in aforementioned U.S. application Ser. No. 13/784,041, in aforementioned U.S. patent application Ser. No. 14/174,413, in aforementioned U.S. application Ser. No. 14/212,493, and/or in Aforementioned U.S. Application Ser. No. 14/507,188, entitled "REGIONAL BIG DATA IN PROCESS CONTROL SYSTEMS." As such, a process plant that performs automatic or autonomous signal processing-based learning may include one or more big data devices, at least some of which includes a respective distributed or embedded big data appliance to operate on big data generated by a big data provider node.

Figure 2:
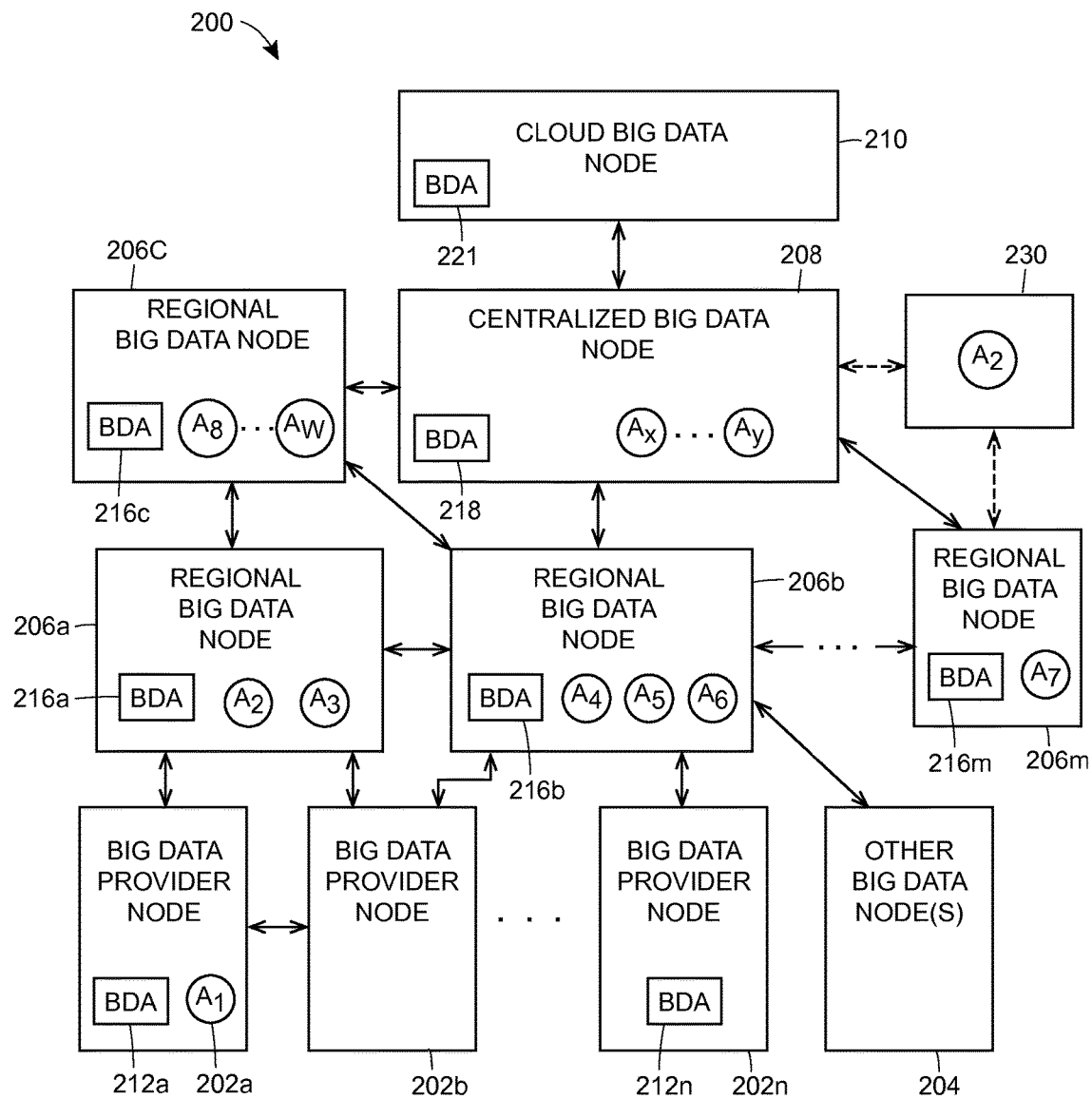
FIG. 2 is a block diagram of an example big data network for a process plant or process control system which may support automatic or autonomous signal processing-based learning.

FIG. 2 is a simplified block diagram of an example big data network 200 for a process plant or process control system that controls one or more processes and that supports process control big data and, in particular, that may operate in conjunction with one or more instances of the automatic or autonomous signal processing-based learning system 100 of FIG. 1. The process control big data network 200 includes one or more process control big data nodes 202-210, each of which collects, observes, generates, stores, analyzes, accesses, transmits, receives, and/or operates on process control big data. The terms "process control big data," "process big data," and "big data," as used interchangeably herein, generally refer to all (or almost all) data that is generated, received, and/or observed by devices included in and associated with the process control system or plant. In an embodiment, all data that is generated by, created by, received at, or otherwise observed by all devices included in and associated with the process plant is collected and stored as big data within the process control big data network 200.

The example process control big data network 200 includes one or more different types of process control big data nodes or devices 202-210, each of which collects, observes, generates, stores, analyzes, accesses, transmits, receives, and/or operates on process control big data generated from or based on the control of the one or more processes by the process plant or process control system. Each process control big data node or device 202-210 is connected to a process control system big data network backbone (not shown), and may use the backbone to communicate with one or more other process control big data nodes. Accordingly, the process control big data network 200 comprises the process control system big data network backbone and the process control big data nodes 202-210 that are communicatively connected thereto. In an example, the process control big data network 200 includes a plurality of networked computing devices or switches that are configured to route packets to/from various other devices, switches or nodes of the network 200 via the backbone.

The process control big data network backbone comprises any number of wired communication links and any number of wireless communication links that support one or more suitable routing protocols, e.g., protocols included in the Internet Protocol (IP) suite (e.g., UDP (User Datagram Protocol), TCP (Transmission Control Protocol), Ethernet, etc.), or other suitable routing protocols. In an embodiment, the backbone supports a streaming protocol such as the Stream Control Transmission Protocol (SCTP) and/or another suitable streaming protocol to stream (e.g., transport) data between process control big data nodes. For example, aforementioned U.S. application Ser. No. 14/506,863 entitled "STREAMING DATA FOR ANALYTICS IN PROCESS CONTROL SYSTEMS" describes examples of streaming protocols and techniques for process control big data, any one or more of which may be utilized by the process control big data network backbone in the network 200. Typically, each node included in the process data big data network 200 may support at least an application layer (and, for some nodes, additional layers) of the routing protocol(s) supported by the backbone. In an embodiment, each process control big data node 202-210 is uniquely identified within the process control system big data network 200, e.g., by a unique network address.

In an embodiment, at least a portion of the process control system big data network 200 is an ad-hoc network. As such, at least some of the nodes 202-210 (and/or one or more other nodes, such as a user interface device 230) may connect to the network backbone (or to another node of the network 200) in an ad-hoc manner.

As FIG. 2 is a simplified diagram that depicts communicative connections between various big data nodes 202-210 in the process control big data network 200, the process control network backbone is not explicitly illustrated in FIG. 2. However, an example of such a backbone which may be utilized with any or all of the techniques described herein is described in aforementioned U.S. patent application Ser. No. 13/784,041. Of course, any or all of the techniques described herein are not limited to being utilized with the backbone described in U.S. patent application Ser. No. 13/784,041, but may be utilized with any suitable communication network backbone.

Turning now to the different types of process control big data nodes or devices 202-210, generally, a process control big data node of the network 200 may be a "big data provider" and/or may include a "big data appliance," as is discussed below.

The terms "big data provider," "big data provider node," or "provider node," as used interchangeably herein, generally refer to a process control big data node that collects, generates, observes, and/or forwards process control related big data using the process control big data network 200. The process control big data that is generated, collected, observed, and/or forwarded by provider nodes may include data that has been directly utilized in or generated from controlling a process within the plant, e.g., first-order real-time and configuration data that is generated or used by process control devices such as controllers, input/output (I/O) devices, and field devices. Additionally or alternatively, process control big data provider nodes may generate, collect, observe, and/or forward data related to delivering and routing such first-order process control data and other data within the process plant, e.g., data related to network control of the big data network 200 and/or of other communication networks in the plant, data indicative of bandwidth, network access attempts, diagnostic data, etc. Further, some process control big data provider nodes may generate, collect, observe, and/or forward data indicative of results, learning, and/or information that has been learned within the process control big data network 200 by analyzing process control big data that it has collected. Typically, such analytics results, learning, and/or learned information are generated from automatic, autonomous analytics performed by one or more process control big data nodes.

In most cases, a big data provider node includes multi-core hardware (e.g., multi-core processors) for transmitting and receiving big data in real-time (e.g., streamed) and, in some embodiments, for caching the real-time big data in preparation for streaming or other delivery over the process control big data network 200. A big data provider node may, in some embodiments, also include high-density memory for the caching of the real-time big data. Examples of real-time data that may be transmitted, received, streamed, cached, collected, and/or otherwise observed by big data provider nodes may include process control data such as measurement data, configuration data, batch data, event data, and/or continuous data. For instance, real-time data corresponding to configurations, batch recipes, setpoints, outputs, rates, control actions, diagnostics, alarms, events and/or changes thereto may be collected. Other examples of real-time data may include process models, statistics, status data, and network and plant management data. In some embodiments, a big data provider node does not cache at least some of the real-time big data that it observes, but instead streams the un-cached data to one or more other big data nodes as the data is observed, received, or generated at the node. Examples of big data provider nodes which may be utilized with any or all of the techniques described herein may be found in aforementioned U.S. patent application Ser. Nos. 13/784,041, 14/174,413, and 14/212,493. Of course, any or all of the techniques described herein may be alternatively or additionally utilized with big data provider nodes other than those described in U.S. application Ser. Nos. 13/784,041, 14/174,413, and 14/212,493.

On the other hand, the terms "big data appliance," "big data appliance node," or "appliance node," as used interchangeably herein, generally refer to a process control big data node that receives, stores, retrieves, and analyzes process control big data. As such, a process control big data appliance (or "BDA") generally operates on big data that has been generated or provided by one or more process control big data provider nodes. In some cases, a big data appliance is included in a big data provider node, or is integrally co-resident with a big data provider within a same node or device. In such cases, the big data appliance is referred to as an "embedded big data appliance," as the appliance is embedded in the provider node or device and operates on the big data that has been received, collected, or generated by the co-resident big data provider. In an example, an embedded big data appliance analyzes big data that has been locally generated and/or provided by the big data provider node on which the embedded big data appliance resides to discover or learn knowledge. This learned knowledge may be stored at the embedded big data appliance, operated on locally by the embedded big data appliance, and/or provided as big data to other big data nodes. Any or all of the techniques described herein may be utilized in conjunction with embedded big data appliances such as described in aforementioned U.S. patent application Ser. No. 14/212,493 and/or in U.S. patent application Ser. No. 14/507,188, entitled "REGIONAL BIG DATA IN PROCESS CONTROL SYSTEMS", for example, although other suitable embedded big data appliances may additionally or alternatively utilized. Further, it is noted that in embodiments in which a big data provider node includes an embedded big data appliance, the cache of the big data provider node may be reduced in size or omitted, as the embedded big data appliance provides local data storage capabilities.

In some cases, a big data appliance may be a stand-alone big data node of the process control big data network 200. That is, in these cases, a big data appliance is not embedded in or co-resident with a big data provider node. Thus, a process control big data node that includes a big data appliance may not necessarily itself be a provider of big data.

Figure 3:
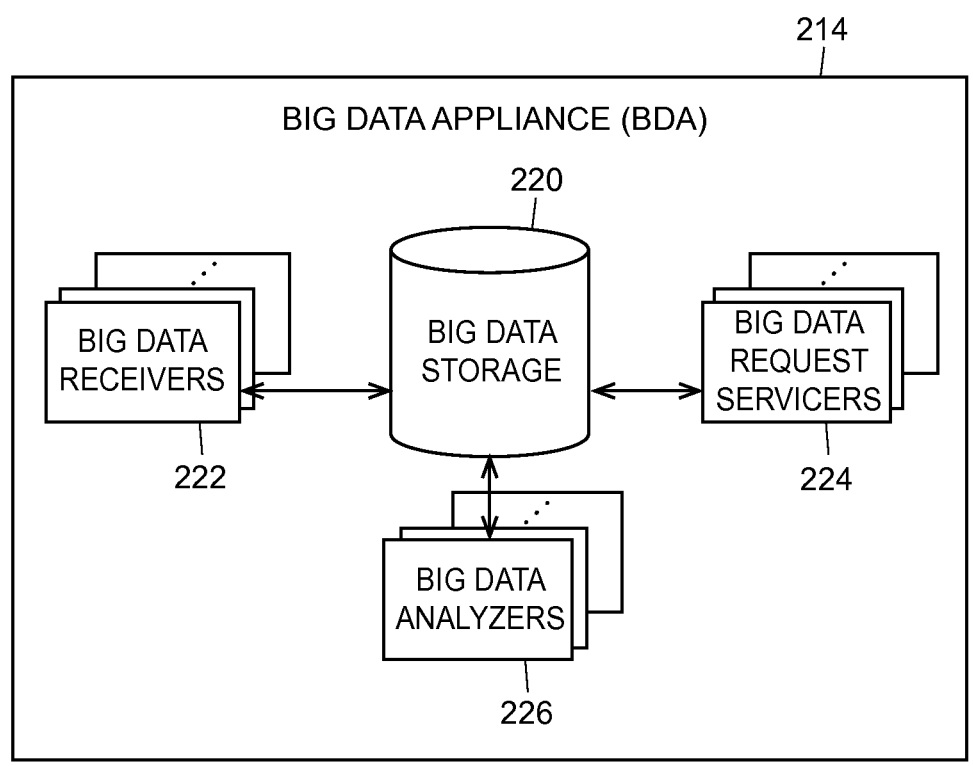
FIG. 3 is a block diagram of an example big data appliance.

FIG. 3 depicts a simplified block diagram of an example big data appliance 214, instances of which may be included in the process control big data network 200 of FIG. 2. Referring to FIG. 3, the example big data appliance 214 includes a big data storage area 220 for historizing or storing received big data, one or more big data appliance receivers 222, and one or more big data appliance request servicers 224. Each of the big data appliance receivers 222 is configured to receive big data packets (which may be streamed from another node and/or may be generated by a big data provider node on which the appliance 214 resides), process the data packets to retrieve the substantive data and timestamp carried therein, and store the substantive data and timestamp in the big data storage area 220 of the appliance 214, e.g., as time-series data and optionally also as metadata. For example, a data point may be tagged and stored as metadata. The big data storage area 220 may comprise multiple local and/or remote physical data drives or storage entities, such as RAID (Redundant Array of Independent Disks) storage, solid-state storage, cloud storage, high-density data storage, and/or any other suitable data storage technology that is suitable for data bank or data center storage, and that has the appearance of a single or unitary logical data storage area or entity to other nodes. Further, each of the big data appliance request servicers 224 is configured to access time-series data and/or metadata stored in the big data appliance storage area 220, e.g., per the request of a requesting entity or application.

In some instances, a big data appliance 214 includes one or more big data analyzers 226 to perform respective data analytics and/or learning on at least parts of the stored big data, typically in an automatic and/or autonomous manner without using any user input to initiate and/or perform the learning analysis. In an embodiment, the big data analyzers 226 individually and/or collectively perform large scale data analysis on the stored data (e.g., data mining, data discovery, etc.) to discover, detect, or learn new information or knowledge. For example, data mining generally involves the process of examining large quantities of data to extract new or previously unknown interesting data or patterns such as unusual records or multiple groups of data records. The big data analyzers 226 may additionally or alternatively perform large scale data analysis on the stored data (e.g., machine learning analysis, data modeling, pattern recognition, predictive analysis, correlation analysis, etc.) to predict, calculate, or identify implicit relationships or inferences within the stored data. In an embodiment, multiple big data analyzers 226 (and/or multiple instances of at least one big data analyzer 226) operate in parallel and/or cooperatively to analyze the data stored in the big data storage area 220 of the appliance 214. An example of cooperative data analytics which may be utilized with any or all of the techniques described herein is found in aforementioned U.S. Application No. 62/060,408 entitled "DATA PIPELINE FOR PROCESS CONTROL SYSTEM ANALYTICS," and/or in aforementioned U.S. patent application Ser. No. 14/507,188 entitled "REGIONAL BIG DATA IN PROCESS CONTROL SYSTEMS," although any suitable cooperative data analytics technique or techniques may be utilized with any or all aspects of the present disclosure.

Typically, each of the big data appliance receivers 222, the big data appliance request servicers 224, and the big data analyzers 226 comprise respective computer-executable instructions stored on one or more non-transitory, tangible memories or data storage devices, and are executable by one or more processor to perform one or more their respective big data functions. In some embodiments, the big data analyzers 226 are not included in the big data appliance 214, but instead are in communicative connection with the big data appliance 214. For example, the big data appliance 214, including the storage area 220, receivers 222 and servicers 125 may be implemented by a first set of computer-executable instructions, and the big data analyzers 226 may be implemented by a second set of computer-executable instructions (which may or may not be stored on the same non-transitory, tangible memories or data storage devices as the first set of computer-executable instructions). Descriptions of various types of example big data appliances and their components which may be utilized with any or all of the techniques described herein may be found in aforementioned U.S. patent application Ser. Nos. 13/784,041, 14/174,413, and 14/212,493, although it is understood that any or all of the techniques described herein may be utilized with other suitable big data appliances.

Returning to FIG. 2, the process control big data network 200 may include process control big data provider nodes 202-210 that operate at various levels, tiers, or orders with respect to first-order or primary process related data that is directly generated, routed, and/or used by process control devices such as controllers, I/O devices, field devices, etc. At the lowest order, tier, or level, "local" big data provider nodes or devices 202a-202n that operate nearest to the process to collect, generate, observe, and/or forward primary process big data related to the input, operation, and output of process devices and equipment in the process plant. As such, "local big data provider nodes or devices" 202a-202n typically are nodes and/or devices that generate, route, and/or receive primary process control data to enable the one or more processes to be controlled in real-time in the process plant. Examples of local big data provider nodes 202a-202n include devices whose primary function is directed to generating and/or operating on process control data to control a process, e.g., wired and wireless field devices, controllers, and I/O devices. These process control devices may be communicatively connected to each other and/or to one or more process control communications networks in a distributed manner. For instance, one or more field devices are communicatively connected to one or more I/O devices, which in turn are communicatively connected to one or more controllers, which in turn are communicatively coupled to one or more process control communication networks (e.g., HART®, WirelessHART®, process control big data, FOUNDATION® Fieldbus, etc.).

Other examples of local big data provider nodes 202a-202n include devices whose primary function is to provide access to or routing of primary process data through one or more communications networks of the process control system (which may include the process control big data network 200 and/or other communication networks). Examples of such types of local big data provider nodes 202a-202n include access points, routers, interfaces to wired control busses, gateways to wireless communications networks, gateways to external networks or systems, and other such routing and networking devices. Still other examples of local big data provider nodes 202a-202n include devices, such as historian devices, that are configured to temporarily store big data throughout the process control system, e.g., as an overflow cache, way-station, or routing queue.

In some cases, a local big data provider node includes a respective local big data appliance, as illustrated in FIG. 2 by the nodes 202a, 202n that respectively include the embedded big data appliances 212a, 212n. Each local, embedded big data appliance 212a, 212n receives and stores respective local big data provided by its respective provider 202a, 202n. Further, in some local big data provider nodes, such as in the node 202a, one or more analytics functions, routines, operations, or processes (represented by the encircled $A_1$) may be performed on at least some of the local big data stored in the appliance 212a. In an embodiment, the analytics $A_1$ are performed by one or more of the big data analyzers 226 of FIG. 3. The learned information, learnings, and/or the results of the one or more analytics $A_1$ may also be stored in the local big data appliance 212a, and at least some of the learned information or results may be provided to another big data node 206a. For example, a local big data provider node that is included in or coupled to a controller that includes an instance of a signal processing module 102, the signal processing module 102 performs a frequency analysis or other signal-processing analysis on the output signal of the controller, and the local big data provider node transmits the results of the analysis to another big data node.

Some local provider nodes, e.g., as illustrated by the node 202n, include a respective local, embedded big data appliance 212n for local big data collection and historization, however, the resident appliance 212n performs minimal or no analytics. As such, the node 202n merely streams (or otherwise transmits, e.g., upon request or at suitable times) locally stored big data to another node 206b, e.g. for analytical processing or for further forwarding. Some local big data nodes, e.g., the node 202b, do not include any big data appliance at all. Such nodes 202b may stream, in real-time or with the aid of a cache, locally observed big data to one or more other big data nodes 202a, 206b.

Various types of real-time data, such as process-related data, plant-related data, and other types of data, may be cached, collected, stored, transmitted, and/or streamed as big data by the big data provider nodes or devices 202a-202n. Examples of process-related data include continuous, batch, measurement, and event data that are generated while a process is being controlled in the process plant (and, in some cases, are indicative of an effect of a real-time execution of the process). Further, process-related data may include process definitions, arrangement or set-up data such as configuration data and/or batch recipe data, data corresponding to the configuration, execution and results of process diagnostics, etc.

Plant-related data, such as data related to the process plant but that may not be generated by applications that directly configure, control, or diagnose a process in the process plant, may also cached, collected, stored, transmitted, and/or streamed by the big data provider nodes 202a-202n as big data. Examples of plant-related data include vibration data, steam trap data, data indicative of a value of a parameter corresponding to plant safety (e.g., corrosion data, gas detection data, etc.), data indicative of an event corresponding to plant safety, data corresponding to the health of machines, plant equipment and/or devices, data corresponding to the configuration, execution and results of equipment, machine, and/or device diagnostics, and data that is useful for diagnostics and prognostics.

Further, other types of data including data highway traffic and network management data related to the process control big data network backbone and of various communications networks of the process plant, user-related data such as data related to user traffic, login attempts, queries and instructions, text data (e.g., logs, operating procedures, manuals, etc.), spatial data (e.g., location-based data), and multi-media data (e.g., closed circuit TV, video clips, etc.) may be cached, collected, stored, transmitted, and/or streamed by the big data provider nodes 202a-202n as big data.

In some embodiments, dynamic measurement and control data may be automatically cached, collected, stored, transmitted, and/or streamed by the big data provider nodes 202a-202n as big data. Examples of dynamic measurement and control data include data specifying changes in a process operation, data specifying changes in operating parameters such as setpoints, records of process and hardware alarms and events such as downloads or communication failures, etc. In addition, static data such as controller configurations, batch recipes, alarms and events may be automatically collected by default when a change is detected or when a controller or other entity is initially added to the big data network 200.

Moreover, in some scenarios, at least some static metadata that describes or identifies dynamic control and measurement data is captured in the big data provider nodes 202a-202n when a change in the metadata is detected. For example, if a change is made in the controller configuration that impacts the measurement and control data in modules or units that must be sent by the controller, then an update of the associated metadata is automatically captured by the big data provider nodes 202a-202n. Additionally or alternatively, parameters associated with the special modules used for buffering data from external systems or sources (e.g., weather forecasts, public events, company decisions, etc.), surveillance data, and/or other types of monitoring data may be automatically captured by the big data provider nodes 202a-202n.

In some situations, added parameters created by end users are automatically captured in the big data provider nodes 202a-202n. For example, an end user may create a special calculation in a module or may add a parameter to a unit that needs to be collected, or the end user may want to collect a standard controller diagnostic parameter that is not communicated by default. Parameters that the end user optionally configures may be communicated in the same manner as the default parameters.

Referring again to the network 200 of FIG. 2, at one or more levels or tiers above the local big data nodes 202a-202n, the process control big data network 200 may include one or more regional big data nodes 206a-206m. To implement regional big data, the process plant or process control system may be viewed as having a plurality of different areas or regions which may be delineated according to any desired manner such as geographical, physical, functional, logical, etc. In an illustrative but non-limiting example, a process plant may have a first region that receives raw materials and produces a first intermediate product, a second region that receives other raw materials and produces a second intermediate product, and a third region that receives the first and second intermediate products to produce an output product. Each of these three different example regions may be serviced by a respective "regional" big data node 206a, 206b, 206m to operate on big data produced by its respective region. Accordingly, a "regional big data node" provides big data support and services for data that is generated and/or provided by a respective grouping or region of local big data provider nodes 202 and, in some cases, by other big data provider nodes 204. Other big data provider nodes 204 may include, for example, big data nodes that are external to the region of the plant (e.g., a portable diagnostics device or an off-line simulator), user interface devices 230, or data sources that are external to the process plant altogether (e.g., a computing device of a materials supplier, a feed providing a weather forecast, etc.).

As shown in FIG. 2, a respective grouping or region serviced by a regional big data node 206a-206m may comprise one or more big data provider nodes 202a-202n and/or other big data nodes 204 that are related according to some geographical, physical, functional, logical, or other desired manner. For example, the regional big data node 206a services a region including the local big data provider nodes 202a and 202b, and the regional big data node 206b services a region including the local big data nodes 202b and 202n, as well as another big data node 204. The particular nodes 202, 204 included in a particular region may stream or deliver data to their respective regional big data node 206 for purposes of regional big data storage, access, and/or analysis. Further, any of the big data provider nodes 202a-202n and/or the other big data nodes 204 may communicate with a particular regional big data node 206a-206m to request regionally available services and/or to access regional big data and metadata stored therein, whether such requesting nodes are included in the particular region of the particular regional big data node 206a-206m or not.

Accordingly, each regional big data node 206a-206m includes a respective regional big data appliance 216a-216m via which big data is received, stored as regional big data, and accessed or requested. Further, each regional big data node 206a-206m typically includes one or more analytics functions, routines, operations, or processes (e.g., $A_2$-$A_w$) that may individually and/or cooperatively operate on at least some of the regional big data. For example, the regional big data appliance 216b may receive local big data from local provider nodes 202b, 202n that are configured to cooperatively control the flow of a liquid through a portion or region of the process plant, and the node 206b may perform an analytics process $A_4$ on at least some of the received data to determine an average transport delay of the liquid within the portion or region of the process plant. The results of the analytics $A_4$ may then be stored or historized as additional regional big data within the regional big data appliance 216b. In an embodiment, each of the analytics $A_2$-$A_w$ are performed by one or more big data analyzers 226 of FIG. 3 that are resident on their respective big data node.

In some situations, the regional big data nodes or devices 206a-206m communicate received or generated big data, learned knowledge or information, and/or analytics results with another regional big data node 206a-206m, e.g., as peers. To illustrate by continuing with the above example, the regional big data node 216a receives learned information that has been generated by the analytics analysis $A_4$ performed by the regional big data node 206b. Subsequently, the regional big data node 206a may then perform one or more respective regional analytics $A_2$, $A_3$ on at least part of the peer-provided learned information from the node 206b in conjunction with the local big data received from the local big data nodes 202a, 202b within its own region. The analytics $A_2$, $A_3$ may, in turn, generate additional regional big data for historization at the regional big data appliance 216a and/or for provision to other big data nodes 206b, 206c, 208. As such, as a regional big data node 206a-206m may originate regional big data in some scenarios (e.g., based on the results or learning of any resident analytics that were performed thereby), a regional big data node 206a-206m may also operate as a regional big data provider node.

Grouping of the big data provider nodes 202a-202n under respective regional big data nodes may be carried out according to any desired manner such as geographical, physical, functional, logical, etc. For example, in an illustrative but non-limiting scenario, a process in the process plant may produce a particular product based on two intermediate products. As such, the local big data provider node 202a may represent a first control loop that produces the first intermediate product, and the local big data provider node 202b may represent a second control loop that produces the second intermediate product. Thus, all process control data that is generated, collected, received or otherwise observed by the two control loops 202a, 202b may be transmitted to the regional big data node 206a for historization, storage and analysis.

In a similar manner, the regional big data node 206b may receive and analyze data from its respective group of big data provider nodes. For example, the regional big data node 206b may be responsible for analyzing the big data corresponding to the production of another product that is based on intermediate products from each of the big data provider nodes 202b, 202n in conjunction with big data provided by other sources 204.

At the regional big data node 206a, the received big data may be analyzed (e.g., by using one or more analytics functions or processes $A_2$, $A_3$) to create or generate learned knowledge that describe meaningful relationships, patterns, correlations, trends, etc., across time and/or across at least some of the various data sets. For example, a certain combination of events in the two control loops 202a, 202b may lead to poor product quality when the particular product is eventually produced. To determine the root causes of the poor product quality, the regional big data node 206a analyzes data generated by the combination of events at or shortly after their occurrence (e.g., when the data corresponding to the events' occurrences is received at the regional big data node 206a). The regional big data node 206a may generate learned knowledge that predicts the poor product quality based on the occurrence of these events, and/or may automatically adjust or change one or more parameters in real-time to mitigate the effects of the combination of events if and when they occur in the future. For instance, the regional big data node 206a may determine a revised setpoint or revised parameter values to better regulate and manage the two control loops 202a, 202b.

Generally, each regional big data node 206a-206m (or its respective big data appliance 216a-216m) analyzes data from its respective group or region of big data provider nodes to determine meaningful patterns, correlations, trends, etc. The learned patterns, correlations, trends, etc. is then stored in the respective regional big data appliances 216a-216m as learned knowledge. As used herein, the term "learned knowledge" or "learnings" generally refers to data, services, functions, routines, and/or applications that are generated as a result of one or more analyses being performed on big data. Further, each regional big data node 206a-206m (or its respective big data appliance 216a-216m) may determine or define a new service, function, routine, or application (and/or modify an existing service, function, routine, or application) based on the initially learned knowledge, which, in turn, is stored as further learned knowledge.

Regional big data nodes 206a-206m may be utilized for layered or leveled learning. For example, one or more regional big data nodes may transmit their learned knowledge and/or stored data to an upstream big data node that oversees multiple regions. As shown in FIG. 2, a regional big data node 206c receives learned knowledge and/or data from the regional big data nodes 206a and 206b, and the node 206c historizes the received big data in its respective embedded appliance 116c. The regional big data node 206c may perform further analysis or learning on at least some of the received learned knowledge and/or data (e.g., by using one or more of the analytics functions $A_8$-$A_w$) to generate additional learned knowledge (e.g., data patterns, trends, correlations, etc., services, functions, routines, and/or applications), which may be, in turn, stored as additional regional big data within the embedded appliance 116c and/or provided to other big data nodes 206a, 206b, 208.

In an embodiment, layered or leveled learning is carried out on a bottom-up basis. In an illustrative but non-limiting example, a regional big data node 206a analyzes data received from its respective group of local big data provider nodes 202a, 202b to determine if its "region" is operating correctly. Knowledge that the regional big data node 206a learns from its analysis may result in the regional big data node 206a generating a new diagnostic routine (e.g., a learned routine). The regional big data node 206a may transmit the generated diagnostic routine to an upstream big data node 206c for storage, usage, and/or access. The regional big data node 206a may independently initiate the sharing of the new diagnostic routine with the upstream regional big data node 206c (e.g., automatically as generated or on a periodic basis), or the regional big data node 206a may cause the new diagnostic routine to be transmitted when the upstream regional big data node 206c requests the regional big data node 206a to share one or more types of new learned knowledge.

In an embodiment, layered or leveled learning is carried out on a top-down basis. To illustrate by continuing with the above example, the upstream regional big data node 206c may analyze the received diagnostic routine and determine that the diagnostic routine is useful or applicable to other regional big data nodes (e.g., the regional big data node 206b). Accordingly, the upstream regional big data node 206c may distribute the diagnostic routine to the regional big data node 206b so that the regional big data node 206b and/or any of the local provider nodes 202a, 202n, 204 included in its region is able to utilize the diagnostic routine for its respective diagnostic purposes. The upstream regional big data node 206c may independently initiate the sharing of the new diagnostic routine with the regional big data node 206b, or the upstream regional big data node 206c may cause the new diagnostic routine to be transmitted upon a request made by the regional big data node 206b. Alternatively or additionally, the upstream regional big data node 206c may generate a general diagnostic routine by aggregating and analyzing learned knowledge received from all regional big data nodes that it is overseeing or connected to. In this scenario, the upstream regional big data node 206c distributes the general diagnostic routine to any or all of its regional big data nodes, e.g., automatically as generated or on a periodic basis, upon request of a particular regional big data node, when the upstream regional big data node 206c receives data from a regional big data node that indicates the general diagnostic may be of use, or for some other reason. Subsequently, and in a similar manner, each regional big data node downstream of the regional big data node 206c may distribute the general diagnostic routine to any number of the local big data providers in its respective region.

In some embodiments, regional big data nodes, e.g., the nodes 206a and 206b, may share learned knowledge with each other, e.g., in a peer-to-peer manner. For example, the regional big data node 206a transmits a new or learned analytics routine directly to the regional big data node 206b so that the regional big data node 206b may utilize the new analytics routine for its own purposes.

It is noted that in FIG. 2, only one upstream regional big data node 206c is depicted. However, the techniques and concepts discussed with respect to FIG. 2 may be applied to any number of upstream regional big data nodes supporting multiple layers or levels of big data historization, storage and learning.

Further, as both regional big data appliances and localized big data appliances service different respective big data nodes and/or different respective groups or regions of the process plant, but do not service the entire process plant or more than one region thereof, both regional big data appliances and localized big data appliances are generally and categorically referred to herein as "distributed big data appliances." Generally, distributed big data appliances communicate big data with multiple other big data appliances. For example, a local big data appliance included in a particular big data provider node may communicate learned knowledge and/or big data to other localized big data appliances included in other big data provider nodes, to one or more regional big data appliances, and/or to a centralized big data appliance (which is described in more detail below). Similarly, a regional big data appliance may receive big data from one or more localized big data appliances and/or big data provider nodes. The regional big data appliance may communicate learned knowledge and/or big data to other regional big data appliances, and/or to a centralized big data appliance.

As mentioned above, in some configurations of the process control big data network 200, at least some of the regional big data nodes or devices 206a-206m, local big data nodes or devices 202a-202n, and/or other big data nodes or devices 204 communicate respective big data, analytics results, and/or learned information to a centralized big data node 208. A "centralized big data node," as referred to herein, typically services multiple regions of the process plant, and in some situations, services a majority or an entirety of the process plant. As such, the centralized big data node 208 includes one or more centralized, embedded big data appliances 218 to receive, store, and provide access to process plant big data. For example, the centralized big data appliance 218 may provide comprehensive, long-term historization of most or all of the big data generated by the process plant, and/or the centralized big data appliance 218 may publish big data for process plant-wide availability to other big data nodes, or even to computing devices within or external to the process plant that are not process control big data nodes.

In some configurations, a single centralized big data node 208 or appliance 218 may not service an entire process control system or plant, but may service more than one region of the process control system or plant. For example, different centralized big data nodes 208 or appliances 218 may be used within a single plant or system to partition different types or areas of big data for security and access purposes. In some configurations, a single centralized big data node 208 or appliance 218 services the entire process plant.

In the process plant, one or more of the regional big data nodes 206a-206m may cause some or all of its generated or received learned knowledge and/or data to be streamed or otherwise delivered to the centralized big data node 208. For example, one or more of the regional big data nodes 206a-206m transmits at least some of its respectively stored learned knowledge and/or data to the centralized big data node 208. In some embodiments, one or more of the regional big data nodes 206a-206m pushes at least some of its respectively stored learned knowledge and/or data to the centralized big data node 208 at periodic intervals. In some embodiments, one or more of the regional big data nodes 206a-206m provides at least a portion of its respectively stored learned knowledge and/or data in response to a request from the centralized big data node 208.

The centralized big data node 208 and/or its embedded appliance 218 may be configured to further analyze any or all of the received learned knowledge and/or data received from the regional big data nodes 206a-206m, e.g., by utilizing one or more analytics functions $A_x$-$A_y$. In an embodiment, each of the analytics $A_x$-$A_y$ are performed by one or more big data analyzers 226 of FIG. 3 that are resident on the respective big data node. The one or more analytics functions $A_x$-$A_y$ may operate on the received learned knowledge and/or data to generate additional knowledge and determine relationships between various entities and providers internal and external to the process plant. The additional knowledge and determined relationships may be stored and otherwise utilized as additional centralized big data at the embedded appliance 218, for example. In some cases, the centralized big data node 208 or appliance 218 utilizes the generated knowledge and relationships to control one or more processes of the plant accordingly.

Indeed, any node 202-206 of the big data network 200 may stream or otherwise provide big data to a centralized big data appliance 218, e.g., for historization or long-term storage. For example, a local big data provider node 202 may stream its big data directly to the centralized big data node 208. Similarly, any node 202-206 of the big data network may request services provided by the embedded centralized appliance 218, and/or may request access to data and metadata stored therein. Further, in embodiments in which multiple centralized big data nodes 208 or appliances 218 service a single process plant, the multiple centralized big data nodes 208 or appliances 218 may communicate in a peer-to-peer manner, similar to that described for the regional big data nodes 206a-206m.

Also similar to the regional big data node 206a-206m, a centralized big data node 208 may itself be a producer or provider of big data in some situations, such as when analytics performed by the centralized big data node 208 (e.g., one or more of the analytics functions $A_x$-$A_y$) result in additional discovered or learned information that is stored at the centralized big data appliance 218 and made accessible to other big data nodes 202-206. However, typically, the majority of the volume of big data handled and serviced by a centralized big data appliance 218 is received from other big data nodes 202-206. A description of an example centralized big data node 208 and an example centralized big data appliance 218 which may be utilized with any or all of the techniques described herein may be found in aforementioned U.S. patent application Ser. No. 13/784,041. However, it is understood that any or all of the techniques described herein may be alternatively or additionally utilized with centralized big data appliances other than those described in U.S. patent application Ser. No. 13/784,041.

In some configurations, a centralized big data node 208 communicates data and learned information to a remote big data node (e.g., a big data node that is remote with respect to the process plant) for big data historization, storage, access, and/or analysis. Such a big data node, referred to herein as a "cloud big data node 210," may provide services to multiple different process plants or process control systems 10. For example, a company that operates multiple different oil refineries may provide a cloud big data node 210 and a cloud big data appliance 221 to service big data related to all of its oil refineries. For instance, via the cloud big data node 210 and the resident cloud big data appliance 221, a centralized big data node of a particular refinery may obtain published big data generated by the process control big data network 200 of the process plant, and may utilize the obtained, published big data for operations at the particular refinery. In some embodiments, any of the big data nodes 202-206 may directly stream or provide data to the cloud big data node 210. Similarly, any of the big data nodes 202-206 may request services provided by the embedded appliance 221 of the cloud big data node 210, and/or access data and metadata stored therein. Although not shown in FIG. 2, a cloud big data node 210 may include one or more respective analytics routines, functions, or processes therein, e.g., as may be provided by big data analyzers 226 of FIG. 3.

Further, it is noted that not all types of big data nodes are included in all process plants. For example, a highest level of big data processing at a particular process plant may be at the regional level, and as such the particular process plant may not include any centralized big data nodes 208, and may not be connected to a cloud big data node 210. Generally, though, to facilitate or support process control big data, a process plant includes at least one local big data provider node 202 and at least one big data appliance 212, 216, 218.

Additionally, in some embodiments, a process plant includes one or more legacy process control devices (not shown) that do not inherently include any big data support. In these embodiments, a gateway node in the plant or an adjunct device directly coupled to a legacy device may convert or translate data messages between a protocol utilized by the legacy device and the protocol utilized by the process control big data network backbone, thereby communicatively connecting the legacy device and the process control big data network 200. Examples of legacy devices being used with a process control big data network are discussed in aforementioned U.S. application Ser. No. 14/506,863, entitled "STREAMING DATA FOR ANALYTICS IN PROCESS CONTROL SYSTEMS."

Moreover, typically, big data nodes or devices 202-210 do not have an integral user interface, although some of the big data nodes or devices 202-210 may have the capability to be in communicative connection with one or more user interface devices 230, e.g., by communicating over a wired or wireless communication link, or by plugging a user interface device 230 into a port of the big data nodes or devices 202-210. In FIG. 2, the user interface device 230 is depicted a big data node that is wirelessly connected to the process control big data network 200.

The user interface device 230 is a device (e.g., a mobile or stationary computing device, a workstation, a handheld device, a surface computing device, a tablet, etc.) that includes one or more integrated user interfaces via which a user or operator may interact with the device and the process control system or process plant to perform activities related to the process plant (e.g., configure, view, monitor, test, diagnose, order, plan, schedule, annotate, and/or other activities). Integrated user interfaces may include a screen, a keyboard, keypad, mouse, buttons, touch screen, touch pad, biometric interface, speakers and microphones, cameras, and/or any other user interface technology. The user interface devices 230 may include a direct wired and/or wireless connection to the process control system big data network backbone, or may include an indirect connection to the backbone, e.g., via an access point or a gateway.

In some embodiments, a user interface device 230 may have one or more built-in analytic capabilities (denoted in FIG. 2 by the encircled $A_z$). In other words, a user interface device 230 may communicate with any number of big data nodes and/or big data appliances to download and/or receive data and perform local analysis $A_z$ on the downloaded/received data to discover or learn knowledge. Indeed, in some configurations, a user interface device 230 may itself be a big data provider node, and may itself provide at least some of the results of its analysis $A_z$ as big data to one or more other local, regional, centralized, or cloud big data nodes 202-210. Examples of the usage of user interface devices in process control big data networks (which may be utilized with any or all of the techniques described herein) may be found, for example, in aforementioned U.S. patent application Ser. No. 14/028,785. Of course, however, other techniques of utilizing user interface devices with process control big data network 200 may be alternatively or additionally employed in conjunction with any or all of the techniques described herein.

Figure 4:
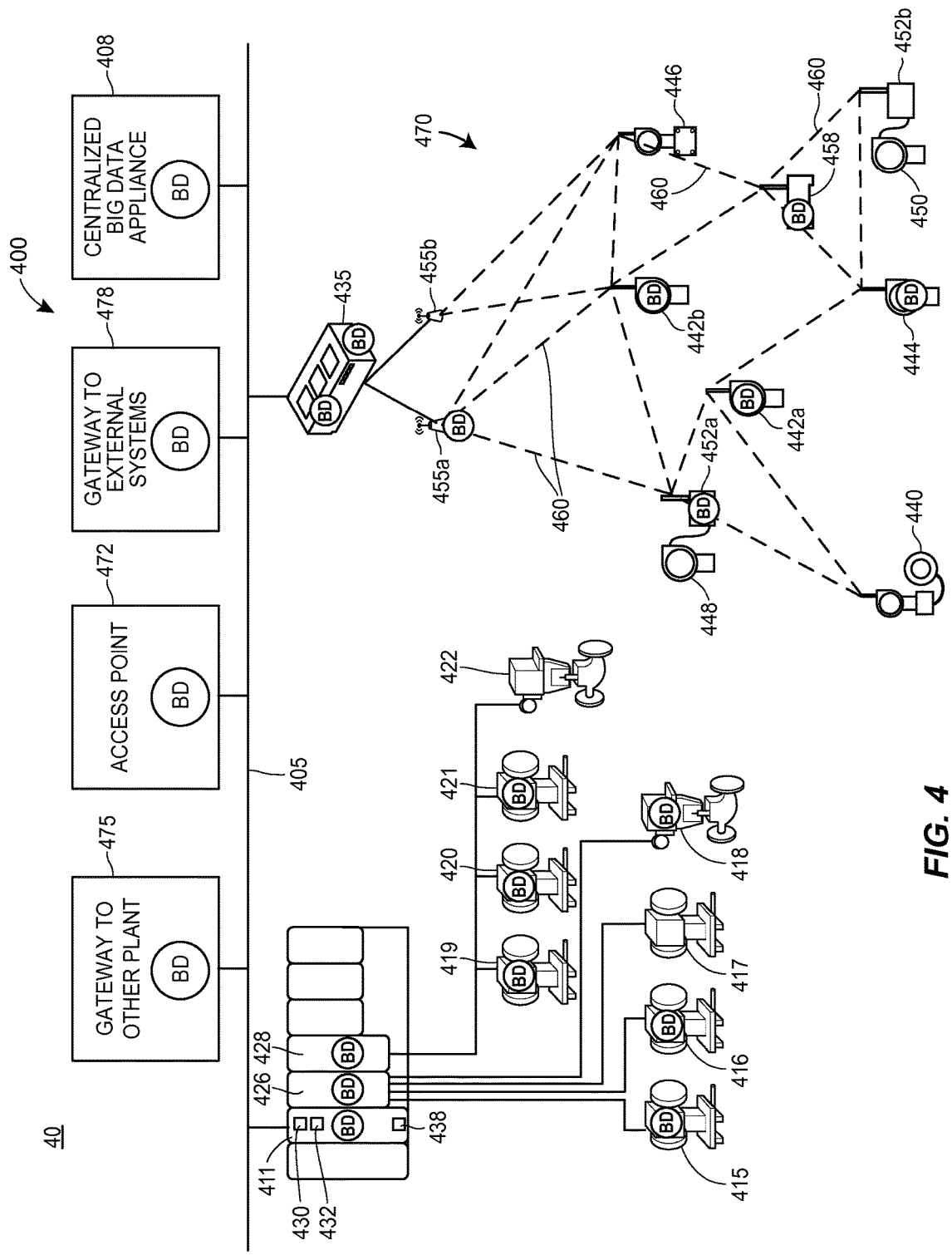
FIG. 4 is a block diagram of an example process plant or process control system in which automatic or autonomous signal processing-based learning may be performed.

Turning now to FIG. 4, FIG. 4 is a block diagram including various example aspects of an example process plant or process control system 40 in which the automatic signal processing-based learning techniques, methods, systems and apparatuses disclosed herein may be implemented and included. For example, at least a portion of the automatic signal processing-based learning system 100 is included in the process plant 40. In an embodiment, at least a portion of the process plant 40 is supported by a process control big data network, such as the process control big data network 200 of FIG. 2. However, while the process plant 40 is described below with respect to features illustrated in FIGS. 2-3 for ease of discussion and not for limitation purposes, it is understood that the process plant 40 may utilize a process control big data network other than that described in FIG. 2, or the process plant 400 may omit any process control big data network, nodes, and/or devices.

In FIG. 4, process control big data nodes or devices are indicated by a "BD" reference that signifies that the node is a process control big data provider node, a big data appliance, or both. For example, nodes or devices indicated by a "BD" reference in FIG. 4 may be, referring to FIG. 2, a local big data provider node and/or appliance 202a-202n, 212a-212n, a regional big data provider node and/or appliance 206a-206m, 216a-216m, a centralized big data provider node 208 and/or appliance 218, or another type of big data node 204.

In FIG. 4, the process control big data nodes BD are nodes of a process control big data network 400. In an embodiment, the process control big data network 400 is the process control big data network 200 of FIG. 2, and the nodes BD are the nodes 202-208 of the network 200. In FIG. 4, the nodes BD are communicatively connected over the network 400 via a process control system big data network backbone 405. The backbone 405 includes a plurality of networked computing devices or switches that are configured to route packets to/from various process control big data nodes BD. The plurality of networked computing devices of the backbone 405 may be interconnected by any number of wireless and/or wired links, and the big data network backbone 405 may support one or more suitable routing protocols, such as a process control big data streaming protocol, as previously discussed with respect to the network 200.

As shown in FIG. 4, the process control big data network 400 includes a centralized big data appliance 408 and multiple other big data provider nodes 411, 415, 416, 418, 419, 420, 421, 426, 428, 435, 442a, 442b, 444, 452a, 455a, 458, 472, 475, 478. One of the example big data provider nodes is a big data process controller device 411 that locally collects, analyzes and stores big data of the process control network or plant 40. The controller 411 is communicatively connected to wired field devices 415-422 via input/output (I/O) cards 426 and 428, and is communicatively connected to wireless field devices 440-446 via a wireless gateway 435 and the process control big data network backbone 405. (In another embodiment, though, the controller 411 may be communicatively connected to the wireless gateway 435 using a communications network other than the big data backbone 405, such as by using a process control communications network that includes any number of wired and/or wireless communication links.) In FIG. 4, the controller 411 is a big data provider node BD of the process control system big data network 400, and is directly connected to the process control big data network backbone 405.

The controller 411, which may be, by way of example, the DeltaV™ controller sold by Emerson Process Management, may operate to implement a batch process or a continuous process using at least some of the field devices 415-422 and 440-446. In an embodiment, in addition to being communicatively connected to the process control big data network backbone 405, the controller 411 may also be communicatively connected to at least some of the field devices 415-422 and 440-446 using any desired hardware, software, and/or communications links or networks associated with, for example, standard 4-20 mA devices, I/O cards 426, 428, and/or any smart communication protocol such as the FOUNDATION® Fieldbus protocol, the HART® protocol, the WirelessHART® protocol, etc. In an embodiment, the controller 411 may be communicatively connected with at least some of the field devices 415-422 and 440-446 using the process control big data network backbone 405. In FIG. 4, the controller 411, the field devices 415-422 and the I/O cards 426, 428 are wired devices, and the field devices 440-446 are wireless field devices. Of course, the wired field devices 415-422 and wireless field devices 440-446 could conform to any other desired standard(s) or protocols, such as any wired or wireless protocols, including any standards or protocols developed in the future.

The process controller device 411 includes a processor 430 that implements or oversees one or more process control routines (e.g., that are stored in a memory 432), which may include control loops. The processor 430 is configured to communicate with the field devices 415-422 and 440-446 and with other process control big data nodes BD that are communicatively connected to the backbone 405. It should be noted that any control routines or modules (including quality prediction and fault detection modules or function blocks) described herein may have parts thereof implemented or executed by different controllers or other devices if so desired. Likewise, the control routines or modules described herein which are to be implemented within the process control system 40 may take any form, including software, firmware, hardware, etc. Control routines may be implemented in any desired software format, such as using object oriented programming, ladder logic, sequential function charts, function block diagrams, or using any other software programming language or design paradigm. The control routines may be stored in any desired type of memory, such as random access memory (RAM), or read only memory (ROM). Likewise, the control routines may be hard-coded into, for example, one or more EPROMs, EEPROMs, application specific integrated circuits (ASICs), or any other hardware or firmware elements. Thus, the controller 411 may be configured to implement a control strategy or control routine in any desired manner.

In some embodiments, the controller 411 implements a control strategy using what are commonly referred to as function blocks, wherein each function block is an object or other part (e.g., a subroutine) of an overall control routine and operates in conjunction with other function blocks (via communications called links) to implement process control loops within the process control system 40. Control based function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 40. Of course, hybrid and other types of function blocks exist. Function blocks may be stored in and executed by the controller 411, which is typically the case when these function blocks are used for, or are associated with standard 4-20 ma devices and some types of smart field devices such as HART devices, or may be stored in and implemented by the field devices themselves, which can be the case with Fieldbus devices. The controller 411 may include one or more control routines 438 that may implement one or more control loops. Each control loop is typically referred to as a control module, and may be performed by executing one or more of the function blocks.

The wired devices 411-422 shown in FIG. 4 include big data wired process control devices 415, 416, and 418-421 and the I/O cards 426, 428. FIG. 4 also shows wired legacy devices 417 and 422, which may operate in conjunction with the wired big data devices 415, 418-421, 426, 428 within the process plant. The wired field devices 415-422 may be any types of devices, such as sensors, valves, transmitters, positioners, etc., while the I/O cards 426 and 428 may be any types of I/O devices conforming to any desired communication or controller protocol. In FIG. 4, the field devices 415-418 are standard 4-20 mA devices or HART devices that communicate over analog lines or combined analog and digital lines to the I/O card 426, while the field devices 419-422 are smart devices, such as FOUNDATION® Fieldbus field devices, that communicate over a digital bus to the I/O card 428 using a Fieldbus communications protocol. In some embodiments, though, at least some of the big data wired field devices 415, 416 and 418-421 and/or at least some of the big data I/O cards 426, 428 additionally or alternatively communicate with the controller 411 using the big data network backbone 405.

The wireless field devices 440-446 shown in FIG. 4 include examples of wireless big data nodes or devices BD (e.g., devices 442a, 442b, 444). FIG. 4 also includes an example of a legacy wireless device (e.g., device 446). The wireless field devices 440-446 communicate in a wireless network 470 using a wireless protocol, such as the WirelessHART protocol. Such wireless field devices 440-446 may directly communicate with one or more other big data devices or nodes BD of the process control big data network 400 that are also configured to communicate wirelessly (using a wireless streaming protocol, for example). To communicate with one or more other big data nodes that are not configured to communicate wirelessly, the wireless field devices 440-446 may utilize a wireless gateway 435 connected to the backbone 405 or to another process control communications network. Any number of wireless field devices that support big data may be utilized in the process plant 40.

The wireless gateway 435, as illustrated in FIG. 4, is another example of a big data node BD included in the process control plant or system 40, and provides access to/from the various wireless devices 440-458 of a wireless communications network 470. In particular, the wireless gateway 435 provides communicative coupling between the wireless devices 440-458, the wired devices 411-428, and/or other nodes or devices of the process control big data network 400 (including the controller 411 of FIG. 4). For example, the wireless gateway 435 may provide communicative coupling by using the big data network backbone 405 and/or by using one or more other communications networks of the process plant 40.

The wireless gateway 435 provides communicative coupling, in some cases, by the routing, buffering, and timing services to lower layers of the wired and wireless protocol stacks (e.g., address conversion, routing, packet segmentation, prioritization, etc.) while tunneling a shared layer or layers of the wired and wireless protocol stacks. In other cases, the wireless gateway 435 may translate commands between wired and wireless protocols that do not share any protocol layers. In addition to protocol and command conversion, the wireless gateway 435 may provide synchronized clocking used by time slots and superframes (sets of communication time slots spaced equally in time) of a scheduling scheme associated with the wireless protocol implemented in the wireless network 470. Furthermore, the wireless gateway 435 may provide network management and administrative functions for the wireless network 470, such as resource management, performance adjustments, network fault mitigation, monitoring traffic, security, and the like.

Similar to the wired field devices 415-422, the wireless field devices 440-446 of the wireless network 470 may perform physical control functions within the process plant 40, e.g., opening or closing valves or take measurements of process parameters. The wireless field devices 440-446, however, are configured to communicate using the wireless protocol of the network 470. As such, the wireless field devices 440-446, the wireless gateway 435, and other wireless nodes 452-458 of the wireless network 470 are producers and consumers of wireless communication packets.

In some scenarios, the wireless network 470 may include non-wireless devices, which may or may not be big data devices. For example, a field device 448 of FIG. 4 may be a legacy 4-20 mA device and a field device 450 may be a traditional wired HART device. To communicate within the network 470, the field devices 448 and 450 may be connected to the wireless communications network 470 via a wireless adaptor (WA) 452a or 452b. In FIG. 4, the wireless adaptor 452b is shown as being a legacy wireless adaptor that communicates using the wireless protocol, and the wireless adaptor 452a is shown as supporting big data and thus is communicatively connected to the big data network backbone 405. Additionally, the wireless adaptors 452a, 452b may support other communication protocols such as Foundation® Fieldbus, PROFIBUS, DeviceNet, etc. Furthermore, the wireless network 470 may include one or more network access points 455a, 455b, which may be separate physical devices in wired communication with the wireless gateway 435 or may be provided with the wireless gateway 435 as an integral device. In FIG. 4, the network access point 455a is illustrated as being a big data device BD, while the network access point 455b is a legacy access point. The wireless network 470 may also include one or more routers 458 to forward packets from one wireless device to another wireless device within the wireless communications network 470, each of which may or may not support distributed big data in the process control system 40. The wireless devices 440-446 and 452-458 may communicate with each other and with the wireless gateway 435 over wireless links 460 of the wireless communications network 470, and/or via the big data network backbone 405, if the wireless devices are distributed and/or centralized big data devices.

Accordingly, FIG. 4 includes several examples of big data devices of nodes BD which primarily serve to provide network routing functionality and administration to various networks of the process control system. For example, the wireless gateway 435, the access point 455a, and the router 458 each include functionality to route wireless packets in the wireless communications network 470. The wireless gateway 435 performs traffic management and administrative functions for the wireless network 470, as well as routes traffic to and from wired networks that are in communicative connection with the wireless network 470. The wireless network 470 may utilize a wireless process control protocol that specifically supports process control messages and functions, such as WirelessHART. As shown in FIG. 4, the devices 435, 455a, 452a, 442a, 442b and 458 of the wireless network 470 support big data in the process control plant 40, however, any number of any types of nodes of the wireless network 470 may support distributed big data in the process plant 40.

Other devices that communicate using other wireless protocols may be big data nodes or devices BD of the process control big data network 400. In FIG. 4, one or more wireless access points 472 are big data devices BD that utilize other wireless protocols, such as Wi-Fi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as near field communications (NFC) and Bluetooth, or other wireless communication protocols. Typically, such wireless access points 472 allow handheld or other portable computing devices (e.g., user interface devices) to communicative over a respective wireless network that is different from the wireless network 470 and that supports a different wireless protocol than the wireless network 470. In some scenarios, in addition to portable computing devices, one or more process control devices (e.g., controller 411, field devices 415-422, or wireless devices 435, 440-458) may also communicate using the wireless protocol supported by the access points 472.

Additionally in FIG. 4, one or more gateways 475, 478 to systems that are external to the immediate process control system 40 are big data nodes or devices BD of the process control big data network 400. Typically, such systems are customers or suppliers of information generated or operated on by the process control system 40. For example, a plant gateway node 475 may communicatively connect the immediate process plant 40 (having its own respective process control big data network backbone 405) with another process plant having its own respective process control big data network backbone. In another example, a single process control big data network backbone 405 may service multiple process plants or process control environments. In still another example, the plant gateway node 475 communicatively connects the immediate process plant 40 with a cloud big data node 210 and/or a cloud big data appliance 221.

In FIG. 4, a plant gateway node 475 communicatively connects the immediate process plant 40 to a legacy or prior art process plant that does not include a process control big data network 400 or backbone 405. In this example, the plant gateway node 475 may convert or translate messages between a protocol utilized by the process control big data backbone 405 of the plant 40 and a different protocol utilized by the legacy system (e.g., Ethernet, Profibus, Fieldbus, DeviceNet, etc.). The one or more external system gateway nodes 478 communicatively connect the process control big data network 400 with the network of an external public or private system, such as a laboratory system (e.g., Laboratory Information Management System or LIMS), an operator rounds database, a materials handling system, a maintenance management system, a product inventory control system, a production scheduling system, a weather data system, a shipping and handling system, a packaging system, the Internet, another provider's process control system, or other external systems.

Although FIG. 4 only illustrates a single controller 411 with a finite number of field devices 415-22 and 440-446, this is only an illustrative and non-limiting embodiment. Any number of controllers 411 may support big data, and any of the controllers 411 may communicate with any number of wired or wireless field devices 415-422, 440-446 to control a process in the plant 40. Furthermore, the process plant 40 may also include any number of wireless gateways 435, routers 458, access points 455, wireless process control communications networks 470, access points 472, and/or gateways 475, 478. Still further, FIG. 4 may include any number of centralized big data appliances 408, which may receive and store collected data and/or generated learned data or knowledge from any or all of the devices in the process plant 40. In some embodiments, the process control big data network 400 may include any number of regional big data appliances and nodes (not shown in FIG. 4).

Further, the combination of aspects, devices, and components included in the example process plant 40 as illustrated by FIG. 4 is exemplary only. The techniques, systems, methods, and apparatuses disclosed herein may be utilized in process plants with zero or more any of the aspects illustrated in FIG. 4. For example, the techniques, systems, methods, and apparatuses disclosed herein may be utilized in a process plant without a centralized big data appliance 408, or in a process plant with one or more regional big data appliances and/or nodes. In another example, the techniques, systems, methods, and apparatuses disclosed herein may be utilized in a process plant with only legacy devices.

Referring now simultaneously to FIGS. 1-4, any number of any the nodes 202, 206, 208, 210 of the process control big data network, the big data appliances 212, 216, 218, 221, the big data nodes 411, 415, 416, 418, 419, 420, 421, 426, 428, 435, 442a, 442b, 444, 452a, 455a, 458, 472, 475, 478, and/or the legacy devices 417, 422, 440, 446, 448, 450, 452b, 455b may include an instance of the signal processing module 102. That is, an instance of the signal processing module 102 may be integral with any node or device included in or associated with a process plant or process control system that generates a signal whose value varies over time, such as a process control device, a big data node, an analyzer, etc. In an embodiment, at least a portion of the signal processing module is implemented as software or computer-executable instructions stored on a memory of any one of the nodes or devices illustrated in FIGS. 1-4, and that are executable by a processor that is co-resident thereon. In such embodiments, additional instructions may be downloaded or transferred into the resident node of the signal processing module 102, e.g., to perform specialized calculations or other types of signal processing functions. For example, the signal processing module 102 of a node may include a linear signal processing function, and at some later point in time a non-linear signal processing function may be downloaded to be resident node. For example, the non-linear signal processing function may be downloaded per a user command, or the resident node may accumulate new learned knowledge that causes the resident node to request the transfer of the non-linear signal processing function (e.g., from another big data node).

In an embodiment, at least a portion of the signal processing module 102 is implemented as a chip, integrated circuit, semiconductor circuit, or other suitable hardware that is included in any one of the nodes or devices illustrated in FIGS. 1-4. For example, at least a portion of the signal processing module 102 (and in some embodiments, both at least a portion of the signal processing module 102 and at least a portion of the analytics module 105) is implemented on one or more integrated digital signal processing (DSP) chips such as, e.g., the Texas Instruments KeyStone multi-core DSP and ARM™ processors, or other suitable DSP chips. The one or more integrated DSP chips may be embedded into or integral with any node or device included in or associated with a process plant or process control system that generates a signal whose value varies over time, such as a process control device, a big data node, an analyzer, etc. For example, one or more of the integrated DSP chips may be included in a valve, vibration measurement device, transmitter, etc. The number of chips may be increased as desired to speed up, enhance, and/or add signal processing functions/capabilities.

In some cases, the signal processing module 102 is not integral with a node or device (of the process plant or process control system) that is generating the signal whose value varies over time, but nonetheless the signal processing module 102 is communicatively coupled to the node or device. For example, the signal processing module 102 may be physically attached to the node or device generating the signal whose value varies over time so that the output of the signal source traverses the signal processing module 102 prior to being transmitted over a process control network, or the signal processing module 102 may monitor the network link over which the output of the node or device is transmitted, e.g., in a manner such as previously described with respect to FIG. 1.

Figure 5:
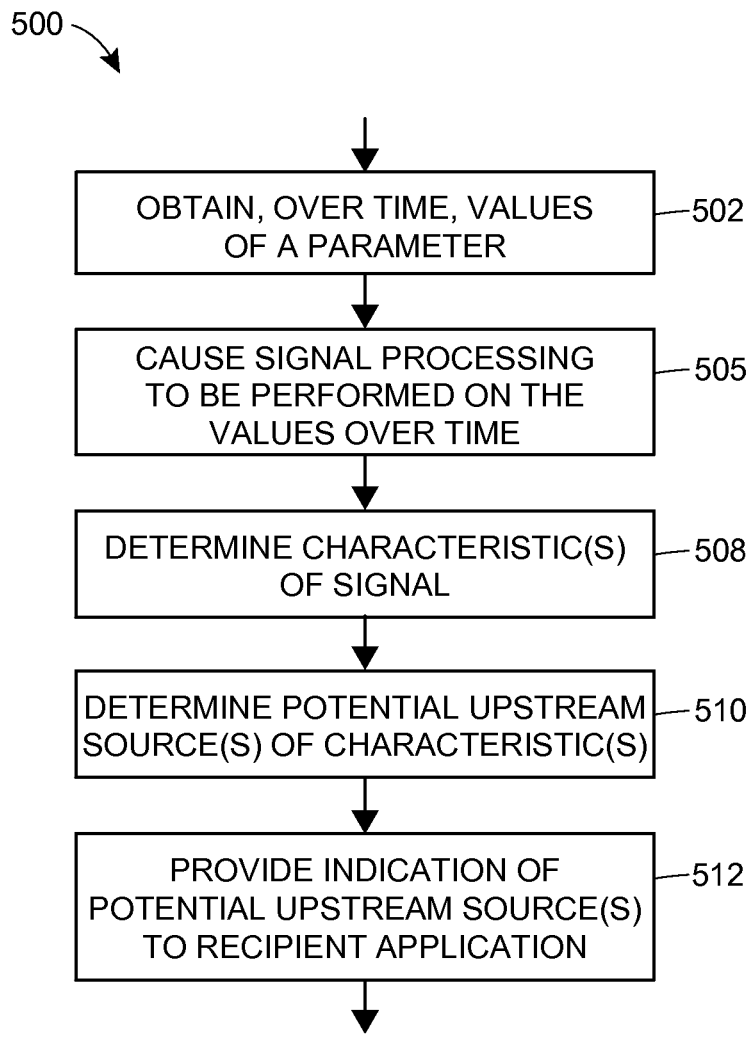
FIG. 5 is a flow diagram of an example method for automatically providing signal processing-based learning in a process plant or process control system.

FIG. 5 is a flow diagram of an example method 500 for automatically providing signal processing-based learning in a process plant or process control system. In an embodiment, the method 500 is performed at least in part by an apparatus, device, or system. The apparatus, device, or system may include hardware, such as an integrated circuit or chip, which performs one or more portions of the method 500. Additionally or alternatively, the system may include a set of computer-executable instructions stored on one or more tangible, non-transitory computer-readable media that, when executed by one or more processors, cause the apparatus or system to perform one or more portions of the method 500. In some embodiments, the method 500 is performed by multiple systems, apparatuses, devices, hardware, and/or sets of computer-executable instructions that are communicatively connected. In an embodiment, at least a part of the method 500 is performed by the system 100 illustrated in FIG. 1, and/or by any one or more portions of the systems and/or networks illustrated in FIGS. 2-4. For ease of reading herein (and not for limitation purposes), FIG. 5 is discussed below in conjunction with FIGS. 1-4, however, it is understood that any or all portions of the method 500 may be performed by systems and/or networks other than those depicted in FIGS. 1-4.

The method 500 includes obtaining, over time, values of a parameter corresponding to the process plant (block 502), where the variations over time of the parameter value comprise a signal corresponding to the process plant. Generally, the values of the parameter are obtained (block 502) in real-time as a signal source generates the signal while the process is being controlled in real-time (e.g., while the signal source and the portion of the process plant in which the signal source is included or with which the signal source is associated is on-line). As such, the signal source generates the signal due to the process being controlled in real-time by the process plant, and the method 500 at the block 502 obtains the signal as the signal is generated in real-time by the signal source. In some situations, at least some aspects of the signal are oscillatory (e.g., over time, around a central value or point of equilibrium, between two or more different states, etc.) In some situations, at least some aspects of the signal are not oscillatory (e.g., impulse responses, aperiodic behavior, etc.). The parameter whose values over time comprise the signal may be, for example, an output of a process control device, a process variable, a measurement, a parameter indicative of a balance of energy, a parameter indicative of a balance of mass, an output of an analytics function performed on big data generated by the process plant, or any other parameter whose value changes over time as a result of the process plant controlling the process. In an embodiment, the variations over time of the parameter value are obtained by a signal processing module 102 of the system 100, which, as previously discussed, may be included in and/or may obtain the signal from a process control device (such as a controller, I/O device, or field device), a big data provider node (which may or may not be integral with a process control device), some other device or node connected to a process control network of the process plant (e.g., a gateway, a router, an adaptor, etc.), a local big data node and/or appliance, a regional big data node and/or appliance, a centralized big data node and/or appliance, or some other big data node of the process plant.

In an example, the signal (e.g., the indications of the variations over time of the value of the parameter) is streamed from a big data node servicing the process plant (e.g., a big data provider node, a distributed big data node, a regional big data node, etc.). In another example, the signal is received via communications that are not streamed, e.g., the signal is received from another device using a protocol that does not support streaming, such as a legacy process control or routing device. In yet another example, the signal or variations over time of the parameter value are obtained by reading a cache or other temporary memory storage area.

In some embodiments of the method 500, obtaining the indications of the variations over time of the parameter value (block 502) includes detecting the variations over time of the parameter value. For example, at the block 502, the method 500 receives an indication from a monitoring function, module or application that alerts the method 500 to detected variations over time of the parameter value. In another example, the method 500 itself may include monitoring the parameter value over time to detect any variations of the parameter value over time.

At a block 505, the method 500 includes causing signal processing to be performed on or applied to the obtained signal. Generally, the signal processing is performed (block 505) in real-time as the signal is obtained (block 502) while the process is being controlled in real-time (e.g., while the signal source and/or respective portion of the process plant is on-line). For example, the signal processing module 102 performs one or more signal processing functions, operations, or techniques on the signal that is obtained in real-time, such as filtering, magnitude or amplitude analysis, power analysis, intensity analysis, phase analysis, frequency analysis, spectrum or spectral analysis, correlation analysis, convolution, smoothing, Hilbert transformation, level detection, linear signal processing, non-linear signal processing, and/or another signal processing technique. In some embodiments, the signal processing is caused to be performed (block 505) on the obtained signal in combination with one or more other inputs or signals. The one or more other inputs or signals that are signal processed in conjunction with the obtained signal may include inputs that were not generated during real-time operations of the process plant, such as measurements that were obtained while the process plant or portion thereof was off-line, an output generated by an off-line, manual analytics tool, data obtained from a model of the process or portion thereof, etc.

At a block 508, the method 500 includes determining, based on the signal processing of the block 505, at least one characteristic of the obtained signal. Typically, the at least one characteristic corresponds to a respective signal processing technique or techniques performed at the block 505, and may include a first-order or characteristic. For example, if spectrum analysis was caused at the block 505 to be performed on the obtained signal, at the block 508, one or more corresponding characteristics of the obtained signal may include an identification of one or more dominant frequencies within the obtained signal, one or more n-th order frequencies (where n is an integer greater than one) within the obtained signal, a harmonic of the obtained signal, a subharmonic of the obtained signal, a bifurcation within the signal, etc. In some embodiments, one or more characteristics are determined at the block 508, and in some embodiments, one or more other, n-th order characteristics of the signal are determined at the block 508. For example, the signal processing module 102 determines the characteristic of the obtained signal based on the results of the applied signal processing techniques.

At a block 510, the method 500 includes determining or identifying at least a subset of a set of elements that are upstream, in the process, of the signal source as potential source(s) of the at least one characteristic of the obtained signal. The set of upstream elements may include elements such as process control variables, parameters or elements, process control devices, other elements of the process plant, pieces of equipment, and/or assets of the process plant, and the set of upstream elements may be automatically or autonomously determined by utilizing an element alignment map of the process being controlled. The subset of the set of upstream elements that are determined to be or identified as sources of the at least one characteristic may be determined or identified by comparing respective strengths of impact of each (or at least some) of the set of upstream elements on the at least one characteristic of the signal. In an embodiment, the respective strengths of impact of the set of upstream element are determined and/or compared automatically. In an example, at least a portion of the block 510 may be performed automatically by the analytics module 105 of FIG. 1, and/or at least a portion of the block 510 may be performed by another analytics module or function that is in communicative connection with the analytics module 105 of FIG. 1.

The method 500 as illustrated in FIG. 5 further includes causing an indication of the one or more determined characteristic sources to be provided to a recipient application (block 512). The recipient application may be, for example, a user interface application. Additionally or alternatively, the recipient application may be an analytics application or function (which may be configured to operate on process plant big data), another type of application or function, and/or a data storage entity. In some situations, an indication of the determined characteristic(s) of the obtained signal, indications of the respective strengths of impact of each potential source on each characteristic, an identification of the signal and/or the corresponding parameter on which the signal is based, and/or an identification of the signal source are additionally or alternatively provided to the recipient application (block 512).

In some embodiments of the method 500, the method optionally includes removing and/or adding one or more frequencies from the signal processing analysis performed at the block 505. For example, signal processing and respective characteristic determination (e.g., the blocks 505 and 508) may be performed multiple times (e.g., multiple executions performed sequentially and/or in parallel) on a signal obtained at the block 502, where each execution of the blocks 505 and 508 is performed on a different combination of number and/or types of frequencies of the signal. The multiple executions may be utilized to determine the respective impact of the various combinations of number/types of frequencies of the signal on the operation of the process control system or plant, such as predicted quality, fault detection, etc. Additionally, if desired, determining the respective upstream characteristic sources and/or providing the indication of said sources to a recipient application (e.g., the block 510 and/or the block 512) may be respectively performed for each execution of the blocks 505 and 508.

Generally, at least a portion (if not all) of the method 500 is unsupervised. That is, the method 500 does not include obtaining any user input in order to perform one or more steps included in the method 500, and indeed may perform some or all of its steps independently of any user input, e.g., automatically and/or autonomously. For example, one or more of the blocks 502, 505, 508, 510, and 512 may be performed in an unsupervised manner. As such, the execution time of the method 500 may occur over a very short interval of time, in particular when the entirety of the method 500 is performed at one or more big data nodes associated with the process plant. In an example, the entirety of the method 500 (e.g., block 502 to 512) is performed in one second or less.

Embodiments of the techniques described in the present disclosure may include any number of the following aspects, either alone or combination:

1. A system for providing big data based learning in a process plant controlling a process. The system includes a signal processing module having (i) an input to receive a signal generated by a signal source associated with the process plant as the signal source generates the signal in real-time, where the signal is indicative of a parameter value that varies over time based on the process plant controlling the process by using at least one field device that performs a physical function; and (ii) an output to provide, to a recipient application, an indication of at least one characteristic of the signal. Additionally, the signal processing module is configured to perform signal processing on the signal to determine the at least one characteristic of the signal.

2. The system of the preceding aspect, wherein the signal source is at least one of: a process control device controlling at least a portion of the process, a big data provider node included in a process control big data network of the process plant, a piece of equipment within the process plant, or an asset of the process plant.

3. The system of any one of the preceding aspects, wherein the signal processing module and the signal source are included in an integral device.

4. The system of the preceding aspect, wherein the integral device is a process control device, and the process control device is one of a controller, a field device performing a physical function to control the at least the portion of the process, or an input/output (I/O) device communicatively connecting the controller and the field device.

5. The system of any one of the preceding aspects, wherein the integral device is a big data node included in a process control big data network of the process plant, and wherein the big data node is one of: a local big data node, a regional big data node, a centralized big data node, or another big data node.

6. The system of any one of the preceding aspects, wherein the signal processing module is included in a first device coupled to a second device in which the signal source is included.

7. The system of the preceding aspect, wherein the second device is a process control device controlling at least a portion of the process, the process control device being one of a controller, a field device performing a physical function to control the at least the portion of the process, or an input/output (I/O) device communicatively coupling the controller and the field device.

8. The system of any one of the preceding aspects, further comprising an analytics module including (i) an input to receive the indication of the at least one characteristic of the signal from the signal processing module; and (ii) an output to provide an indication of a source of the at least one characteristic of the signal to a recipient application, where the recipient application being a user interface application or another application. The analytics module is configured to determine that at least one member of a set of upstream elements is the source of the at least one characteristic of the signal, where the set of upstream elements being elements that are associated with the process plant and that are upstream, within the process, of the signal, and the determination that the at least one member is the source of the at least one characteristic of the signal is based on respective strengths of impact of members of the set of upstream elements on the at least one characteristic of the signal. Additionally, the source of the at least one characteristic of the signal includes at least one of a process control device, a process variable, a piece of equipment, or an asset of the process plant that is upstream of the signal source.

9. The system of the preceding aspect, wherein the recipient application is a first recipient application, and the system further comprises a presentation module. The presentation module includes an input to receive learned output from the analytics module, and further includes an output to provide the learned output to one or more recipient applications. The one or more recipient applications include the first recipient application, and the learned output includes at least one of: the indication of the source of the at least one characteristic of the signal, or other information learned by the analytics module.

10. The system of the preceding aspect, wherein the presentation module is configured to determine the one or more recipient applications.

11. The system of any one of the preceding aspects, wherein the analytics module is a first analytics module, and the recipient application is the another application included in a second analytics module.

12. The system of any one of the preceding aspects, wherein the analytics module is a first analytics module, and the first analytics module determines the source of the at least one characteristic of the signal based on (i) the respective strengths of impact of the members of the set of upstream elements on the at least one characteristic of the signal, and (ii) information provided by a second analytics module.

13. The system of any one of the preceding aspects, wherein the second analytics module comprises a process element alignment module.

14. The system of any one of the preceding aspects, wherein the signal processing module and the analytics module are both included in a single big data node that is communicatively connected to a network of the process plant.

15. The system of any one of the preceding aspects, wherein the signal processing module is included in a first node corresponding to the process plant, the analytics module is included in a second node corresponding to the process plant, and the second node is communicatively connected to the first node.

16. The system of the preceding aspect, wherein the first node further includes the signal source, and the second node is a big data node included in a process control big data network of the process plant.

17. The system of any one of the preceding aspects, wherein the parameter value is indicative of a value of one of an output signal of a process control device, a process variable, a measurement, a balance of energy, a balance of mass, or an output of another analytics module.

18. The system of any one of the preceding aspects, wherein the variations over time of the parameter value comprise one or more oscillations.

19. The system of any one of the preceding aspects, wherein the signal processing performed on the signal includes at least one of: filtering, magnitude or amplitude analysis, power analysis, intensity analysis, phase analysis, frequency analysis, spectrum or spectral analysis, correlation analysis, convolution, smoothing, Hilbert transformation, level detection, linear signal processing, non-linear signal processing, or another signal processing technique.

20. The system of any one of the preceding aspects, wherein the at least one characteristic of the signal comprises at least one of: a dominant frequency, an n-th order frequency wherein n is an integer greater than one, a harmonic, a subharmonic, or a bifurcation of the signal.

21. The system of any one of the preceding aspects, wherein the signal processing module operates in real-time without supervision.

22. A system for automatically performing big data based learning in a process plant controlling a process. Said system may be included in the system of any one of the preceding aspects, in an example. In another example, the system of any one of the preceding aspects may be included in said system. Said system includes a signal processing module configured to receive a signal generated by a signal source as the signal source generates the signal in real-time, where the signal indicative of a value of a parameter that varies over time based on the process plant controlling the process by using at least one field device performing a respective physical function. The signal processing module is further configured to perform signal processing on the signal to determine one or more characteristics of the signal.

Said system further includes an analytics module configured to receive an indication of the one or more characteristics determined by the signal processing module, and determine one or more sources of the one or more characteristics of the signal. The one or more sources are one or more members of a set of elements that are upstream, within the process, of the signal, and each of the one or more members of the set of upstream elements has a respective impact on the one or more characteristics of the signal that is greater than a respective impact of at least one other member of the set of upstream elements that is not included in the one or more members. The analytics module is further configured to cause an indication of the one or more sources of the one or more characteristics of the signal to be provided to a recipient application, where the recipient application is a user interface application or another application.

23. The system of the preceding aspect, wherein the recipient application is a first recipient application, and the system further includes a presentation module configured to receive an output of the analytics module and cause the output to be delivered to a determined set of recipient applications. The first recipient application is included in the determined set of recipient applications, and the indication of the one or more sources of the one or more characteristics of the signal is included in the output of the analytics module.

24. The system of aspect 22 or of aspect 23, wherein the output of the analytics module further includes additional learned knowledge determined by the analytic module over various stages of learning.

25. The system of any one of aspects 22-24, wherein at least one of an indication of the signal, an indication of the signal source, or an indication of the one or more characteristics of the signal is provided to the recipient application.

26. The system of any one of aspects 22-25, wherein the signal processing module is included in a first node, and the analytics module is included in a second node communicatively coupled to the first node.

27. The system of the preceding aspect, wherein the signal source is included in the first node.

28. The system of any one of aspects 22-27, wherein the first node is at least one of: (i) a process control device operating to control at least a portion of the process, the process control device being one of a field device performing a physical function to control at least a portion of the process, a controller, or an input/output (I/O) device communicatively connecting the field device and the controller; or (ii) a first big data provider node included in a process control big data network of the process plant. Additionally, the second node is a second big data node included in the process control big data network.

29. The system of any one of aspects 22-28, wherein the signal processing module and the analytics module are included in an integral device or node.

30. The system of any one of aspects 22-29, wherein the integral device or node is at least one of: (i) a process control device operating to control at least a portion of the process, the process control device being one of a field device performing a physical function to control at least a portion of the process, a controller, or an input/output (I/O) device communicatively connecting the field device and the controller; or (ii) a big data node included in a process control big data network of the process plant.

31. The system of any one of aspects 22-30, wherein the value of the parameter corresponds to one of a value of an output signal of a process control device, a value of a process variable, a measurement, a value indicative of a balance of energy, a value indicative of a balance of mass, or a value of an output generated by a big data analysis function.

32. The system of any one of aspects 22-31, wherein the signal processing performed on the signal comprises causing at least one of: filtering, magnitude or amplitude analysis, power analysis, intensity analysis, phase analysis, frequency analysis, spectrum or spectral analysis, correlation analysis, convolution, smoothing, Hilbert transformation, level detection, linear signal processing, non-linear signal processing, or another signal processing technique.

33. The system of any one of aspects 22-32, wherein the one or more characteristics of the signal comprises at least one of: a dominant frequency, an n-th order frequency wherein n is an integer greater than one, a harmonic, a subharmonic, or a bifurcation of the signal.

34. The system of any one of aspects 22-33, wherein the one or more sources of the one or more characteristics of the signal include at least one of a process control device, a process variable, a piece of equipment, or an asset corresponding to the process plant and upstream of the signal source.

35. The system of any one of aspects 22-34, wherein the analytics module is a first analytics module, the system further includes a second analytics module, and the recipient application is included in the second analytics module.

36. The system of any one of aspects 22-35, wherein the system operates autonomously in real-time without any user input.

37. A method for providing big data based-learning in a process plant controlling a process. At least part of the method may be performed by the system of any one of the preceding aspects, in an example. The method includes obtaining, at a signal processing-based learning system, indications of variations over time of a value of a parameter, where the variations over time of the parameter value are a signal generated by a signal source, the variations over time of the parameter value are generated based on controlling the process in the process plant, and the signal is obtained as the signal source generates the signal in real-time. Additionally, the method includes causing, by the signal processing-based learning system, one or more signal processing functions to be applied to the signal; and determining, by the signal processing-based learning system, at least one characteristic of the signal based on the application of the one or more signal processing functions. The method further includes determining, by the signal processing-based learning system, at least a subset of a set of elements that are upstream, within the process, of the signal to be one or more sources of the at least one characteristic of the signal, where the determination of the at least the subset is based on respective strengths of impact of the set of upstream elements on the at least one characteristic of the signal. The method still further includes causing, by the signal processing-based learning system, an indication of the one or more sources of the at least one characteristic of the signal to be provided to a recipient application, where the recipient application is a user interface application or another application.

38. The method of the preceding aspect, wherein obtaining the indications of the variations over time of the parameter value comprises obtaining indications of variations over time of a value of one of: an output signal of a process control device, a process variable, a measurement, a parameter indicative of a balance of energy, a parameter indicative of a balance of mass, or an output of an analytics function performed on big data generated by the process plant.

39. The method of aspect 37 or of aspect 38, wherein causing signal processing to be performed on the signal comprises causing at least one of: filtering, magnitude or amplitude analysis, power analysis, intensity analysis, phase analysis, frequency analysis, spectrum or spectral analysis, correlation analysis, convolution, smoothing, a Hilbert transformation, level detection, linear signal processing, non-linear signal processing, or another signal processing technique to be performed on the signal.

40. The method of any one of aspects 37-39, wherein causing the signal processing to be performed on the signal to determine the at least one characteristic of the signal comprises causing the signal processing to be performed on the signal to determine at least one of: a dominant frequency, an n-th order frequency wherein n is an integer greater than one, a harmonic, a subharmonic, or a bifurcation.

41. The method of any one of aspects 37-40, wherein determining the at least one characteristic of the signal based on the signal processing comprises determining the at least one characteristic of the signal based on the signal processing and based on at least one of: measurements obtained while at least a portion of the process is on-line, measurements obtained while the at least the at least the portion of the process is off-line, or data obtained from a model of the at least the portion of the process.

42. The method of any one of aspects 37-41, wherein determining the at least the subset of the set of upstream elements to be the one or more sources of the at least one characteristic of the signal comprises determining at least one of a process control device, a piece of equipment, a process variable, or an asset to be the one or more sources of the at least one characteristic of the signal.

43. The method of any one of aspects 37-42, wherein at least one of: the method is performed over a duration of time of one second or less, or the method is an unsupervised method.

44. The method of any one of aspects 37-43, wherein at least one of: obtaining the indications of the variations over time of the parameter value comprises detecting the variations over time of the parameter value; or obtaining the variations over time of the signal comprises obtaining an indication of one or more oscillations included in the signal.

45. The method of any one of aspects 37-44, wherein: the signal processing-based learning system includes a signal processing module coupled to an analytics module; obtaining the signal at the signal processing-based learning system comprises obtaining the signal at the signal processing module of the signal processing-based learning system; causing, by the signal processing-based learning system, the one or more signal processing functions to be applied to the signal comprises applying, by the signal processing module of the signal processing-based learning system, the one or more signal processing functions to the signal; and determining, by the signal processing-based learning system, the one or more sources of the at least one characteristic of the signal comprises determining, by the analytics module of the signal processing-based learning system, the one or more sources of the at least one characteristic of the signal.

46. The method of any one of aspects 37-45, wherein the analytics module is a first analytics module, and at least one of: obtaining the signal comprises obtaining a signal from a second analytics module; or causing the indication of the one or more sources of the at least one characteristic of the signal to be provided to the recipient application comprises causing the indication of the one or more sources of the at least one characteristic of the signal to be provided to the second analytics module or to a third analytics module.

47. Any one of the preceding aspects in combination with any one or more other preceding aspects.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed:

1. A system for providing big data based learning in a process plant controlling a process, the system comprising:
   a process control device that is one of a controller, a field device performing a physical function to control at least the portion of the process, or an input/output (I/O) device communicatively connecting the controller and the field device;
   a signal processing module that is integral with the process control device, the integrated process control device and signal processing module including at least one memory and at least one processor, and the signal processing module including:
      an input to receive a signal generated by a signal source associated with the process plant as the signal source generates the signal in real-time, the signal indicative of parameter value that varies over time based on the process plant controlling the process by using at least one field device that performs a respective physical function, and the process control device being the signal source;
an output to provide, to one or more respective recipient applications, an indication of at least one characteristic of the signal; and
computer-executable instructions that are stored in the at least one memory and that, when executed by the at least one processor, cause the signal processing module to perform real-time signal processing on the signal as the process control device generates the signal in real-time to determine the at least one characteristic of the signal, the real-time signal processing including at least one of: magnitude or amplitude analysis, power analysis, intensity analysis, phase analysis, frequency analysis, spectrum or spectral analysis, correlation analysis, convolution, smoothing, Hilbert transformation, level detection, linear signal processing, or non-linear signal processing; and
an analytics module including:
an input to receive the indication of the at least one characteristic of the signal from the signal processing module; and
an output to provide an indication of a source of the at least one characteristic of the signal to the one or more respective recipient applications, the one or more respective recipient applications including at least one of a user interface application or another application; and
wherein:
the analytics module is configured to determine that at least one member of a set of upstream elements is the source of the at least one characteristic of the signal, the set of upstream elements being elements that are associated with the process plant and that are upstream, within the process, of the signal, and the determination that the at least one member is the source of the at least one characteristic of the signal is based on respective strengths of impact of members of the set of upstream elements on the at least one characteristic of the signal; and
the source of the at least one characteristic of the signal includes at least one of a process control device, a process variable, a piece of equipment, or an asset of the process plant that is upstream of the signal source.

2. The system of claim 1, wherein:
the process control device is a first signal source, the signal generated by the first signal source is a first signal, and the signal processing module is a first signal processing module; and
the system further comprises a second signal processing module integral with a second signal source generating a second signal, the second signal processing module performing real-time signal processing on the second signal as the second signal is generated in real-time by the second signal source, the second signal source being one of: a second process control device controlling a respective at least a portion of the process, a big data node included in a process control big data network of the process plant, a piece of equipment within the process plant, or an asset of the process plant.

3. The system of claim 2, wherein the second signal source is the big data node included in the process control big data network of the process plant, and wherein the big data node is one of: a local big data node, a regional big data node, a centralized big data node, or another big data node.

4. The system of claim 2, wherein the system further comprises a third signal source and a third signal processing module performing real-time signal processing on a third signal generated by the third signal source as the third signal is being generated in real-time by the third signal source, the third signal source included in a first device, and the third signal processing module included in a second device coupled to the first device in which the third signal source is included.

5. The system of claim 4, wherein:
the third signal source is a third process control device controlling a respective at least a portion of the process, the third process control device being one of a third controller, a third field, or a third input/output (I/O).

6. The system of claim 2, wherein the signal generated by the second signal source is indicative of a parameter value that is indicative of a value of one of an output signal of the second process control device, a process variable, a measurement, a balance of energy, a balance of mass, or an output of an analytics module.

7. The system of claim 1, wherein:
the system further comprises a presentation module, the presentation module including:
an input to receive learned output from the analytics module; and
an output to provide the learned output to the one or more respective recipient applications; and
the learned output includes at least one of the indication of the source of the at least one characteristic of the signal, or other information learned by the analytics module.

8. The system of claim 7, wherein the presentation module is configured to determine the one or more respective recipient applications.

9. The system of claim 1, wherein the analytics module is a first analytics module, and the one or more respective recipient applications include the another application included in a second analytics module.

10. The system of claim 1, wherein the analytics module is a first analytics module, and the first analytics module determines the source of the at least one characteristic of the signal based on (i) the respective strengths of impact of the members of the set of upstream elements on the at least one characteristic of the signal, and (ii) information provided by a second analytics module.

11. The system of claim 10, wherein the second analytics module comprises a process element alignment module.

12. The system of claim 1, wherein the analytics module is integral with the process control device and the signal processing module, and the process control device is a single big data node that is communicatively connected to a process control big data network of the process plant.

13. The system of claim 1, wherein the integrated process control device and signal processing module is included in a first node corresponding to the process plant, the analytics module is included in a second node corresponding to the process plant, and the second node is communicatively connected to the first node.

14. The system of claim 13, the second node is a big data node included in a process control big data network of the process plant.

15. The system of claim 1, wherein the variations over time of the parameter value comprise one or more oscillations.

16. The system of claim 1, wherein the at least one characteristic of the signal comprises at least one of: a dominant frequency, an n-th order frequency wherein n is an integer greater than one, a harmonic, a subharmonic, or a bifurcation of the signal.

17. The system of claim 1, wherein the signal processing module operates without supervision.

18. The system of claim 1, wherein the real-time signal processing further includes at least one of filtering or another signal processing technique.

19. A system for automatically performing big data based learning in a process plant controlling a process, the system comprising:
one or more processors;
one or more tangible, non-transitory memories;
a signal processing module comprising first computer-executable instructions that are stored on the one or more tangible, non-transitory memories and that, when executed by the one or more processors, cause the system to:
receive a signal generated by a signal source as the signal source generates the signal in real-time, the signal indicative of a value of a parameter that varies over time based on the process plant controlling the process by using at least one field device performing a respective physical function; and
perform real-time signal processing on the signal as the signal source generates the signal in real-time to determine one or more characteristics of the signal, the real-time signal processing including at least one of: magnitude or amplitude analysis, power analysis, intensity analysis, phase analysis, frequency analysis, spectrum or spectral analysis, correlation analysis, convolution, smoothing, Hilbert transformation, level detection, linear signal processing, or non-linear signal processing; and
an analytics module comprising second computer-executable instructions that are stored on the one or more tangible, non-transitory memories and that, when executed by the one or more processors, cause the system to:
receive an indication of the one or more characteristics determined by the signal processing module;
determine one or more sources of the one or more characteristics of the signal, the one or more sources being one or more members of a set of elements that are upstream, within the process, of the signal, and each of the one or more members of the set of upstream elements having a respective impact on the one or more characteristics of the signal that is greater than a respective impact of at least one other member of the set of upstream elements that is not included in the one or more members; and
cause an indication of the one or more sources of the one or more characteristics of the signal to be provided to a recipient application, the recipient application being a user interface application or another application,
wherein the signal processing module is integral with a process control device that is one of a controller, a field device that performs a physical function to control at least a portion of the process, or an input/output (I/O) device communicatively connecting the controller and the field device, and
wherein the process control device is the signal source.

20. The system of claim 19, wherein:
the recipient application is a first recipient application;
the system further comprises a presentation module comprising third computer-executable instructions that are stored on the one or more tangible, non-transitory memories and that, when executed by the one or more processors, cause the system to receive an output of the analytics module and cause the output to be delivered to a determined set of recipient applications;
the first recipient application is included in the determined set of recipient applications; and
the indication of the one or more sources of the one or more characteristics of the signal is included in the output of the analytics module.

21. The system of claim 20, wherein the output of the analytics module further includes additional learned knowledge determined by the analytic module over various stages of learning.

22. The system of claim 19, wherein at least one of an indication of the signal, an indication of the signal source, or an indication of the one or more characteristics of the signal is provided to the recipient application.

23. The system of claim 19, wherein the integral process control device and signal processing module is a first node, and the analytics module is included in a second node communicatively coupled to the first node.

24. The system of claim 23, wherein:
the first node is a first big data provider node included in a process control big data network of the process plant; and
the second node is a second big data node included in the process control big data network.

25. The system of claim 19, wherein the analytics module is integral with the process control device and the signal processing module.

26. The system of claim 25, wherein the process control device is a big data node included in a process control big data network of the process plant.

27. The system of claim 19, wherein the value of the parameter corresponds to one of a value of an output signal of the process control device, a value of a process variable, a measurement, a value indicative of a balance of energy, a value indicative of a balance of mass, or a value of an output generated by a big data analysis function.

28. The system of claim 19, wherein the one or more characteristics of the signal comprises at least one of: a dominant frequency, an n-th order frequency wherein n is an integer greater than one, a harmonic, a subharmonic, or a bifurcation of the signal.

29. The system of claim 19, wherein the one or more sources of the one or more characteristics of the signal include at least one of the process control device, a process variable, a piece of equipment, or an asset corresponding to the process plant and upstream of the signal source.

30. The system of claim 19, wherein the analytics module is a first analytics module, the system further includes a second analytics module, and the recipient application is included in the second analytics module.

31. The system of claim 19, wherein the system operates autonomously in real-time without any user input.

32. The system of claim 19, wherein the real-time signal processing further includes at least one of filtering or another signal processing technique.

33. A method for providing big data based-learning in a process plant controlling a process, the method comprising:
obtaining, at a signal processing module included in a signal processing-based learning system, indications of variations over time of a value of a parameter, the variations over time of the parameter value being a signal generated by a signal source, the variations over time of the parameter value generated based on controlling the process in the process plant, the signal being obtained as the signal source generates the signal in real-time, the signal source being a process control device that is one of a controller, a field device that performs a physical function to control at least a portion of the process, or an input/output (I/O) device communicatively connecting the controller in the field device, and the signal processing module being integral with the process control device;

causing, by the signal processing module of the signal processing-based learning system, one or more signal processing functions to be applied in real-time to the signal as the signal source generates the signal in real-time, the one or more signal processing functions including at least one of: magnitude or amplitude analysis, power analysis, intensity analysis, phase analysis, frequency analysis, spectrum or spectral analysis, correlation analysis, convolution, smoothing, Hilbert transformation, level detection, linear signal processing, or non-linear signal processing;

determining, by the signal processing-based learning system, at least one characteristic of the signal based on the application of the one or more signal processing functions;

determining, by the signal processing-based learning system, at least a subset of a set of elements that are upstream, within the process, of the signal to be one or more sources of the at least one characteristic of the signal, the determination of the at least the subset based on respective strengths of impact of the set of upstream elements on the at least one characteristic of the signal; and causing, by the signal processing-based learning system, an indication of the one or more sources of the at least one characteristic of the signal to be provided to a recipient application, the recipient application being a user interface application or another application.

34. The method of claim 33, wherein obtaining the indications of the variations over time of the parameter value comprises obtaining indications of variations over time of a value of one of: an output signal of the process control device, a process variable, a measurement, a parameter indicative of a balance of energy, a parameter indicative of a balance of mass, or an output of an analytics function performed on big data generated by the process plant.

35. The method of claim 33, wherein causing the signal processing to be performed on the signal to determine the at least one characteristic of the signal comprises causing the signal processing to be performed on the signal to determine at least one of: a dominant frequency, an n-th order frequency wherein n is an integer greater than one, a harmonic, a subharmonic, or a bifurcation.

36. The method of claim 33, wherein determining the at least one characteristic of the signal based on the signal processing comprises determining the at least one characteristic of the signal based on the signal processing and based on at least one of: measurements obtained while at least a portion of the process is on-line, measurements obtained while the at least the at least the portion of the process is off-line, or data obtained from a model of the at least the portion of the process.

37. The method of claim 33, wherein determining the at least the subset of the set of upstream elements to be the one or more sources of the at least one characteristic of the signal comprises determining at least one of the process control device, a piece of equipment, a process variable, or an asset to be the one or more sources of the at least one characteristic of the signal.

38. The method of claim 33, wherein at least one of:
the method is performed over a duration of time of one second or less, or
the method is an unsupervised method.

39. The method of claim 33, wherein at least one of:
obtaining the indications of the variations over time of the parameter value comprises detecting the variations over time of the parameter value; or
obtaining the variations over time of the signal comprises obtaining an indication of one or more oscillations included in the signal.

40. The method of claim 33, wherein:
the signal processing-based learning system includes an analytics module coupled to the signal processing module; and
determining, by the signal processing-based learning system, the one or more sources of the at least one characteristic of the signal comprises determining, by the analytics module of the signal processing-based learning system, the one or more sources of the at least one characteristic of the signal.

41. The method of claim 40, wherein the analytics module is a first analytics module, and
causing the indication of the one or more sources of the at least one characteristic of the signal to be provided to the recipient application comprises causing the indication of the one or more sources of the at least one characteristic of the signal to be provided to a second analytics module.

42. The system of claim 33, wherein the one or more signal processing functions further includes at least one of filtering or another signal processing technique.

* * * * *